United States Patent
Glotin et al.

(10) Patent No.: US 8,638,641 B2
(45) Date of Patent: Jan. 28, 2014

(54) REAL-TIME ROBUST METHOD FOR DETERMINING THE TRAJECTORY OF ONE OR MORE CETACEANS BY MEANS OF PASSIVE ACOUSTICS, USING A LAPTOP COMPUTER

(75) Inventors: Hervé Gilles Pierre Glotin, La Garde (FR); Pascale Véronique Giraudet, La Garde (FR); Frédéric Caudal, Montauroux (FR)

(73) Assignee: Universite du Sud Toulon Var, Cedex (FR)

( * ) Notice: Subject to any disclaimer, the term of this patent is extended or adjusted under 35 U.S.C. 154(b) by 0 days.

(21) Appl. No.: 12/676,055

(22) PCT Filed: Sep. 3, 2008

(86) PCT No.: PCT/FR2008/001227
§ 371 (c)(1),
(2), (4) Date: May 28, 2010

(87) PCT Pub. No.: WO2009/066012
PCT Pub. Date: May 28, 2009

(65) Prior Publication Data
US 2010/0290316 A1 Nov. 18, 2010

(30) Foreign Application Priority Data
Sep. 3, 2007 (FR) ...................................... 07 06162

(51) Int. Cl.
*G01S 3/80* (2006.01)
*G01S 5/22* (2006.01)
(52) U.S. Cl.
CPC ........................................ *G01S 5/22* (2013.01)
USPC .......................................................... 367/127

(58) Field of Classification Search
USPC .......................................................... 367/127
See application file for complete search history.

(56) References Cited

U.S. PATENT DOCUMENTS 5,563,849 A 10/1996 Hall et al.
5,689,250 A * 11/1997 Kremser ....................... 340/904

(Continued)

OTHER PUBLICATIONS

Giraudet, P.; Glotin, H.; , "Echo-Robust and Real-Time 3D Tracking of Marine Mammals Using Their Transient Calls Recorded by Hydrophones Array," Acoustics, Speech and Signal Processing, 2006. ICASSP 2006 Proceedings. 2006 IEEE International Conference on , vol. 4, no., pp. IV, May 14-19, 2006.*

(Continued)

*Primary Examiner* — Isam Alsomiri
*Assistant Examiner* — James Hulka
(74) *Attorney, Agent, or Firm* — Buchanan Ingersoll & Rooney PC

(57) ABSTRACT

The trajectory of at least one marine animal emitting sound signals in the form of series of clicks, such as a cetacean, is passively determined. During successive processing time windows, raw analog signals are acquired from a plurality of hydrophones disposed in a marine environment and converted into digital data. Digital data filtering eliminates spurious noises and keeps the data, for each pair of hydrophones and each processing window, that corresponds to potential values (TDOAs) for the time-difference of arrival of the sound signals at two different hydrophones. For each hydrophone pair, the consistency of the TDOAs is checked and a number of filtered and mutually-consistent TDOAs are selected. Based on the filtered and mutually-consistent TDOAs, the successive instantaneous positions of the click sources are determined by means of nonlinear regression, and the trajectory of at least one marine animal in the environment is deduced in real time.

15 Claims, 19 Drawing Sheets

(56) References Cited

U.S. PATENT DOCUMENTS

| | | | |
|---|---|---|---|
| 2003/0076949 A1* | 4/2003 | Laberteaux | 379/406.05 |
| 2003/0206522 A1* | 11/2003 | Caia et al. | 370/230.1 |
| 2004/0029557 A1* | 2/2004 | Pugliese | 455/404.2 |
| 2005/0249035 A1* | 11/2005 | Chiappetta et al. | 367/98 |
| 2006/0277038 A1* | 12/2006 | Vos et al. | 704/219 |
| 2006/0291332 A1* | 12/2006 | Szajnowski | 367/127 |

OTHER PUBLICATIONS

Pascale Giraudet, Hervé Glotin,"Real-time 3D tracking of whales by echo-robust precise TDOA estimates with a widely-spaced hydrophone array", Applied Acoustics, vol. 67, Issues 11-12, Nov.-Dec. 2006, pp. 1106-1117.*

Olivier Adam, Jean-François Motsch, Francine Desharnais, Nancy DiMarzio, Douglas Gillespie, Robert C. Gisiner, "Overview of the 2005 workshop on detection and localization of marine mammals using passive acoustics", Applied Acoustics, vol. 67, Issues 11-12, Nov.-Dec. 2006, pp. 1061-1070.*

R.P. Morrissey, J. Ward, N. DiMarzio, S. Jarvis, D.J. Moretti,"Passive acoustic detection and localization of sperm whales (*Physeter macrocephalus*) in the tongue of the ocean" Applied Acoustics, vol. 67, Issues 11-12, Nov.-Dec. 2006, pp. 1091-1105.*

Courmontagne, P.; Chaillan, F.; , "The Adaptive Stochastic Matched Filter for SAS Images denoising," Oceans 2006 , pp. 1-6, Sep. 18-21, 2006.*

Shi-Huang Chen; Jhing-Fa Wang; , "A wavelet-based voice activity detection algorithm in noisy environments," Electronics, Circuits and Systems, 2002. 9th International Conference on , pp. 995-998 vol. 3, 2002.*

International Search Report (PCT/ISA/210) for PCT/FR2008/001227 mailed Apr. 28, 2009.

\* cited by examiner

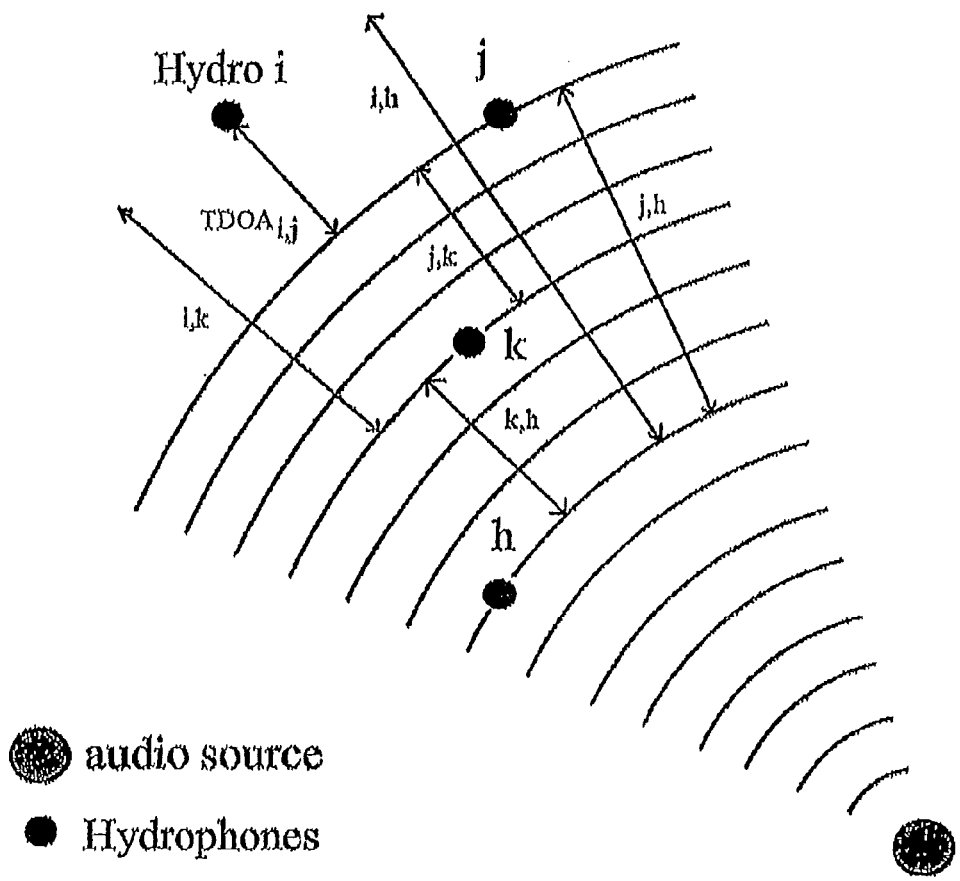
FIGURE 2: Principle of transitivity of TDOAs illustrated for TDOA(i,j), TDOA(j,h) and TDOA(i,h). The indices u,v,w,x,y,z index the rank of each TDOA extracted from the intercorrelation of the pair of hydrophones concerned.
$$TDOA_u(i,j) + TDOA_v(j,k) = TDOA_w(i,k) \pm 0.006,$$
$$TDOA_u(i,j) + TDOA_x(j,h) = TDOA_y(i,h) \pm 0.006,$$
$$TDOA_w(i,k) + TDOA_z(k,h) = TDOA_y(i,h) \pm 0.006,$$
$$TDOA_v(j,k) + TDOA_z(k,h) = TDOA_x(j,h) \pm 0.006.$$

FIGURE 3.1: Click of a single whale on the raw signal
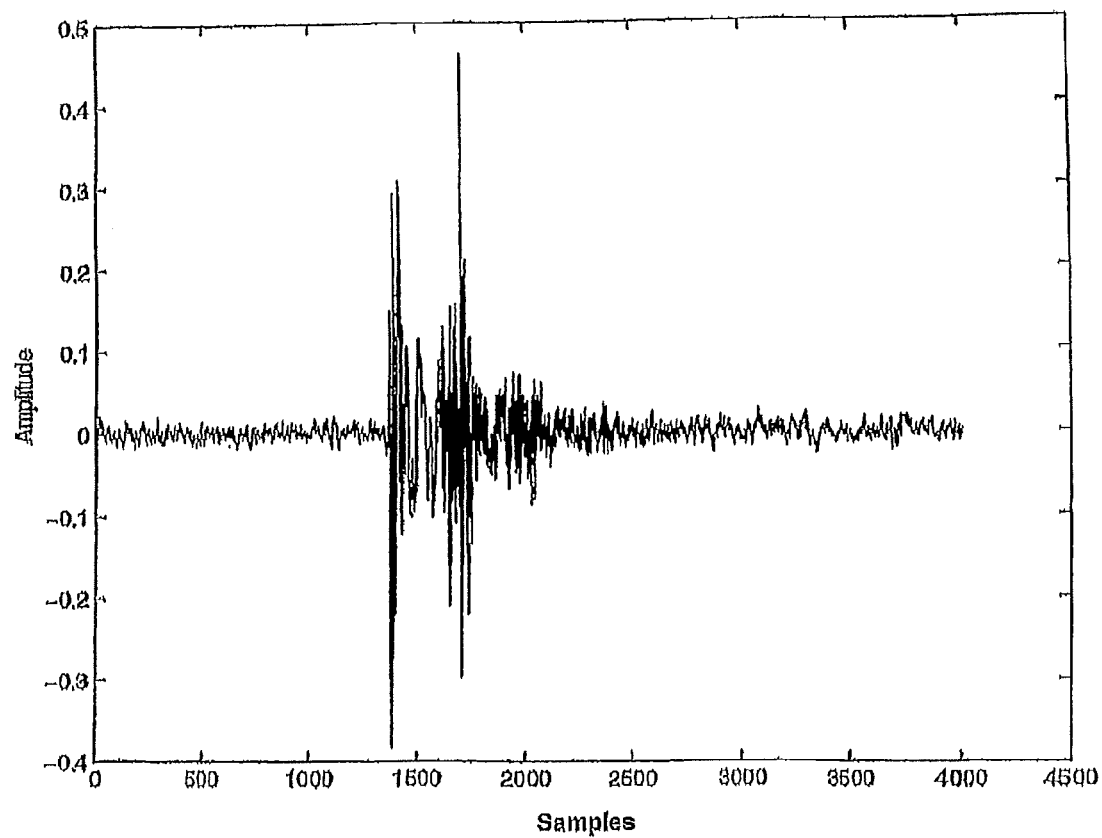

FIGURE 3.2: Click of a single whale after filtering with the Teager-Kaiser algorithm
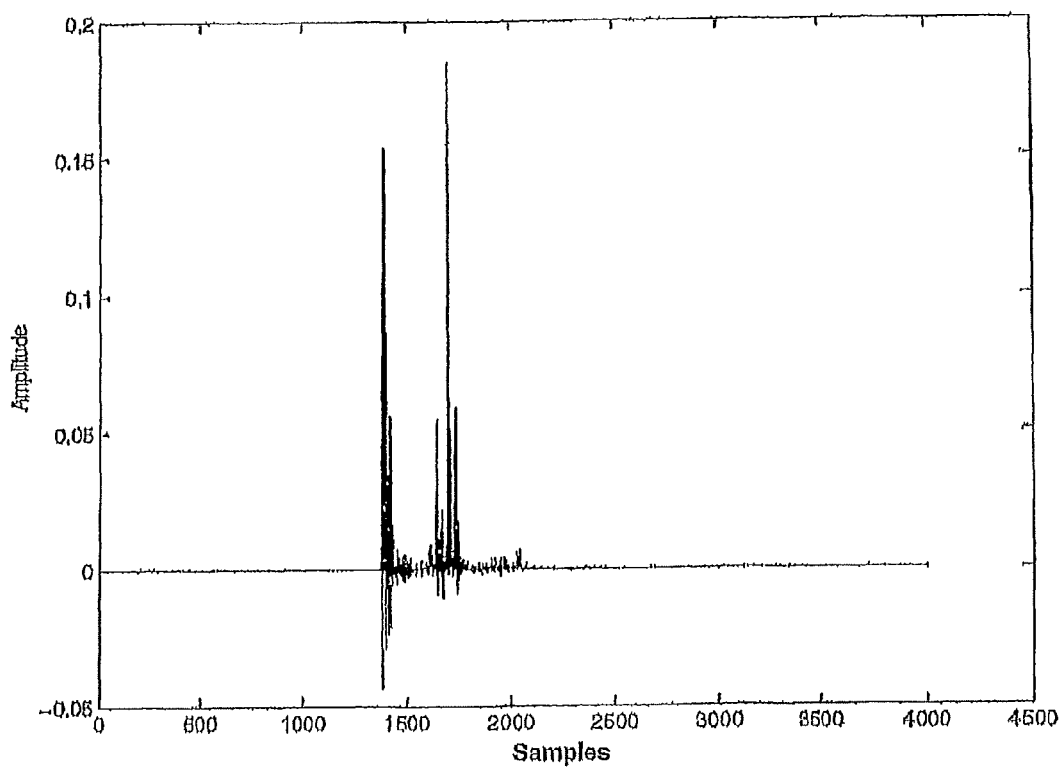

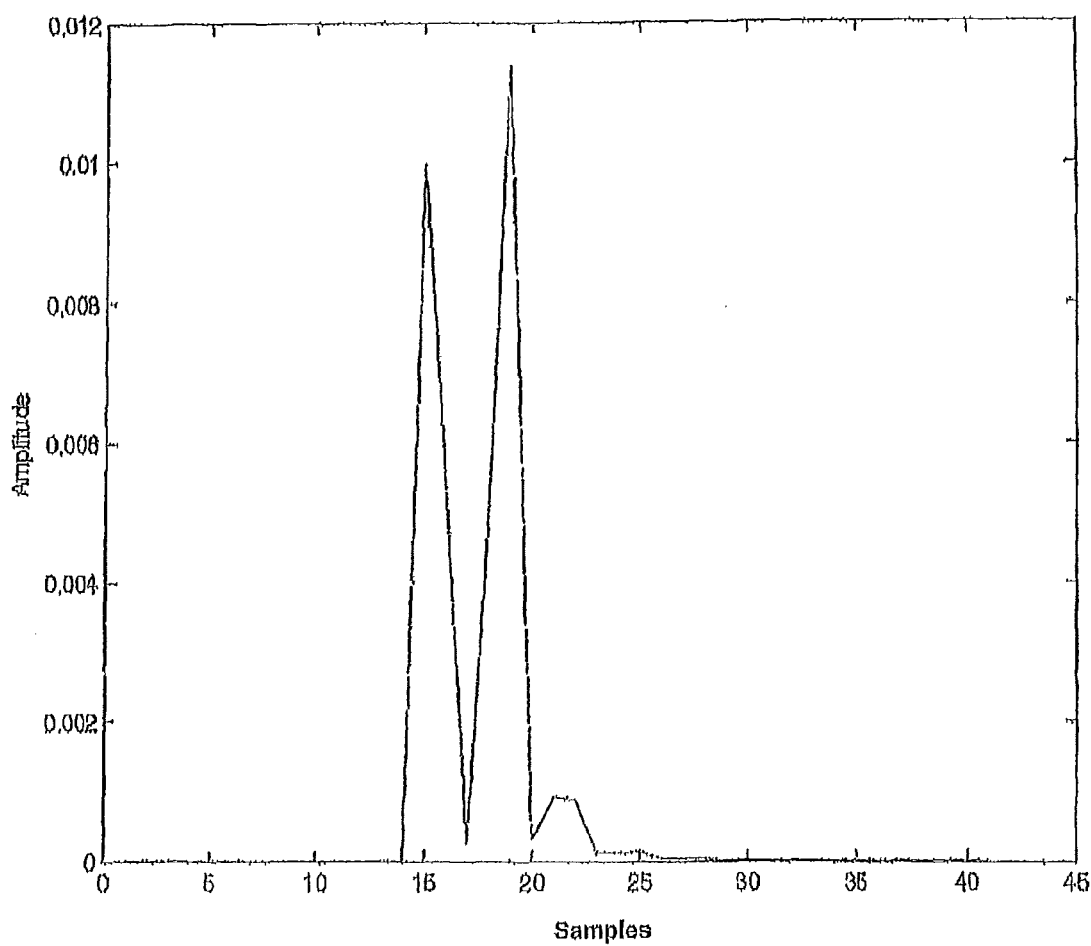
FIGURE 3.3: Click of a single whale after decimation

FIGURE 4.1: Series of clicks before filtering, by the Teager-Kaiser algorithm, of the real signal from a single whale
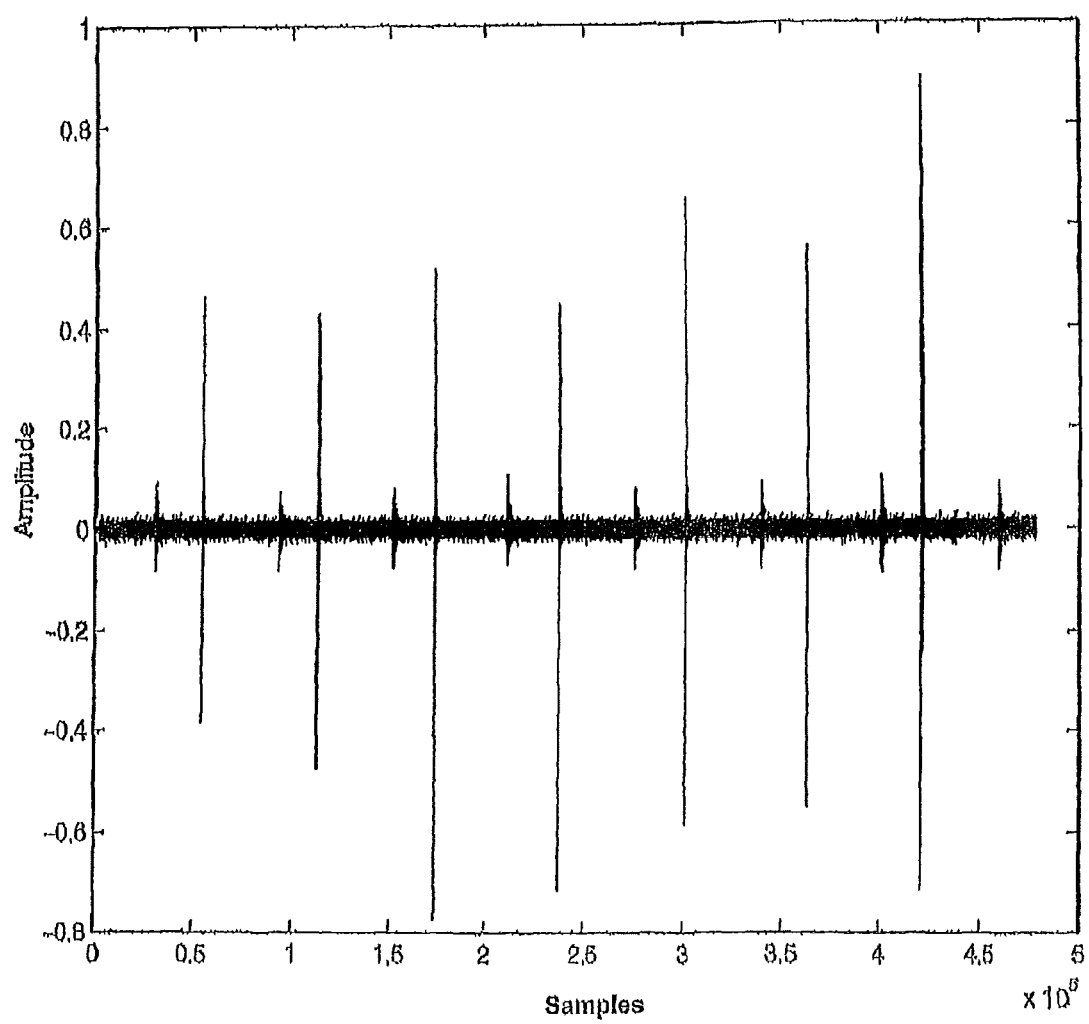

FIGURE 4.2: Series of clicks after filtering, by the Taeger-Kaiser algorithm, of the real signal from a single whale
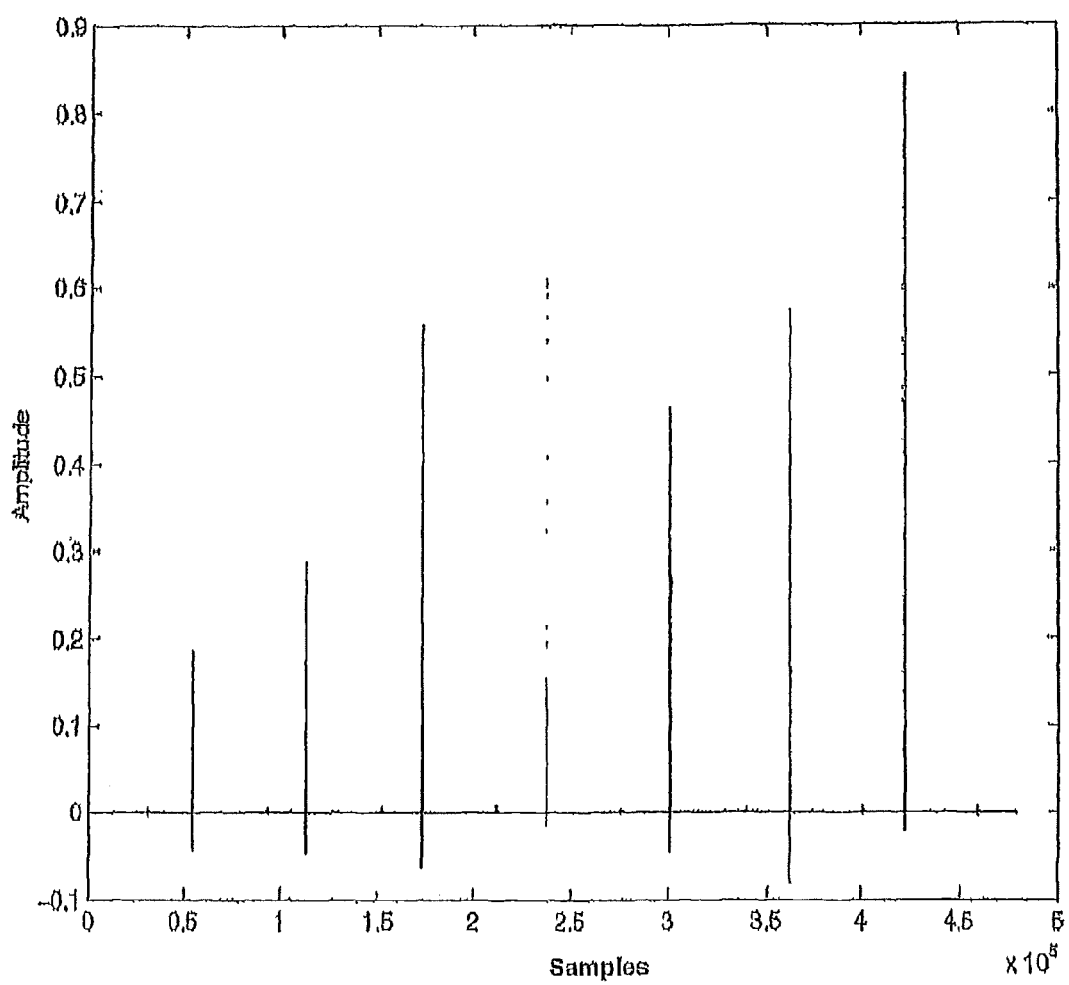

FIGURE 5: Series of clicks of single whale on the raw signal after Teager-Kaiser filtering + decimation (figure according to real signal from a single whale)
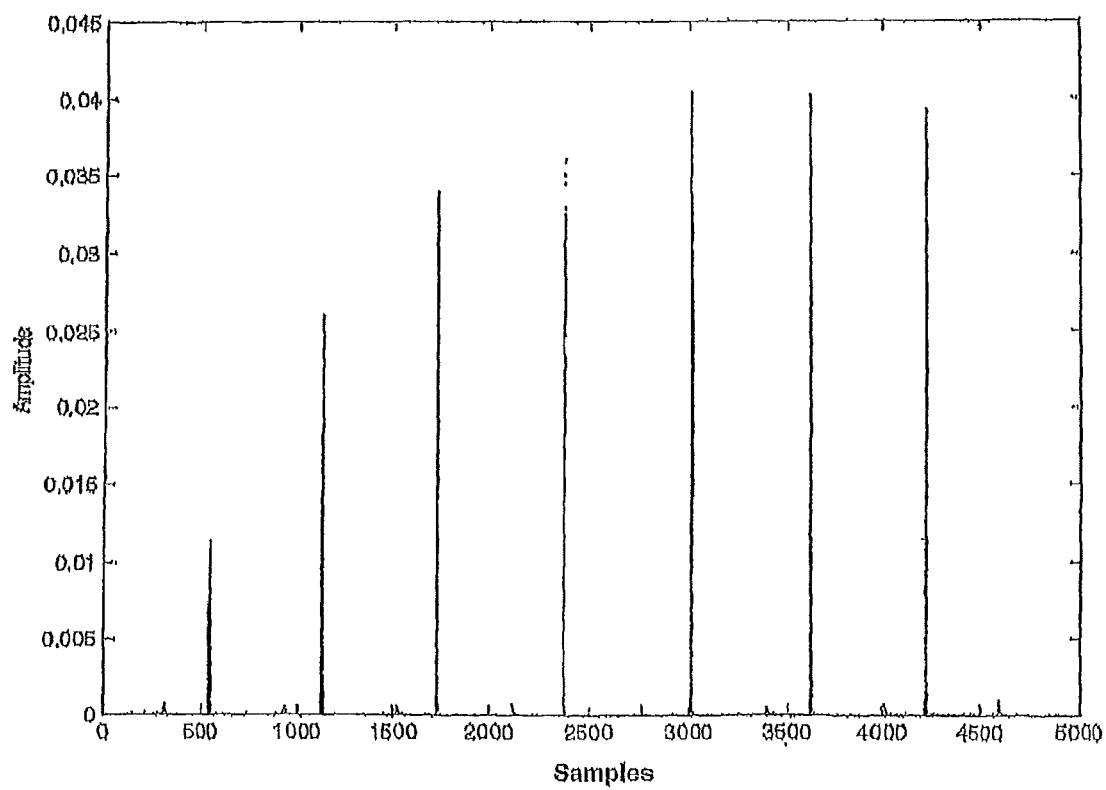

FIGURE 6.1: Series of clicks from a single whale on the raw signal after the Mallat algorithm (and then square root); figure according to real signal from a single whale
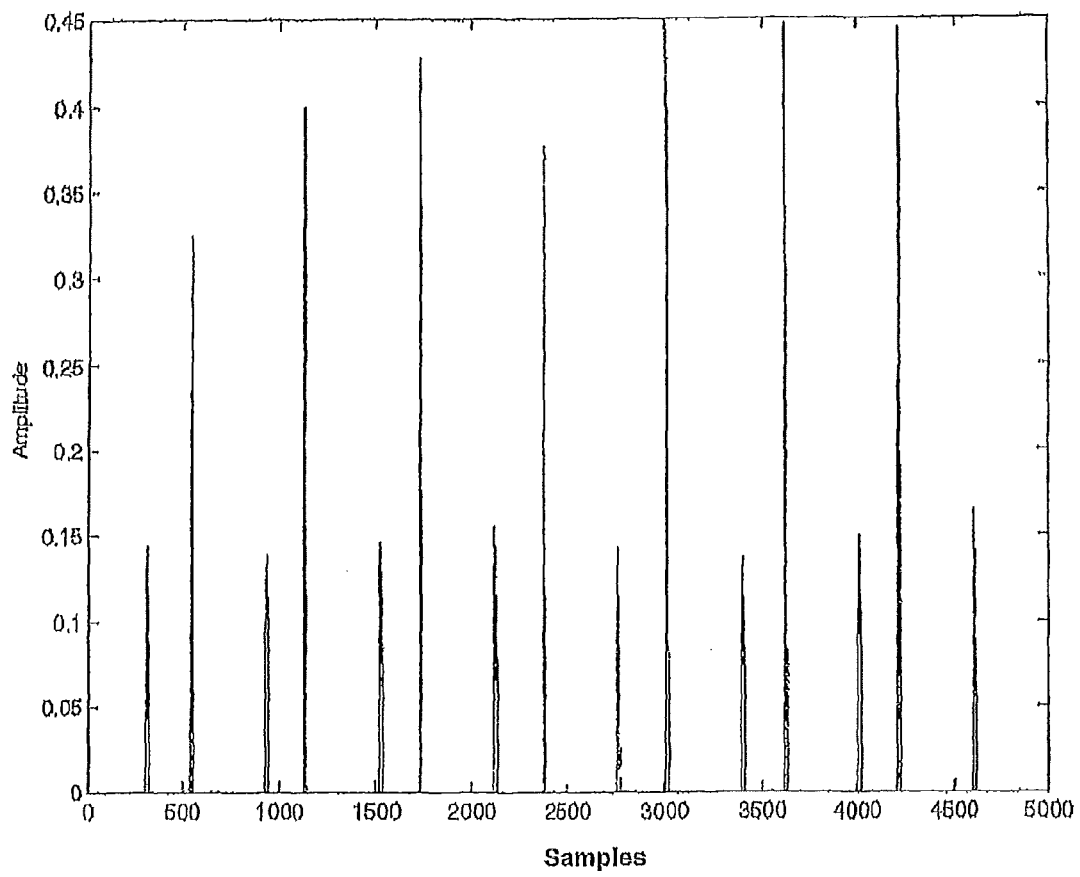

FIGURE 6.2: Series of clicks from a single whale on the raw signal after adaptive stochastic filtering (ASF); figure according to real signal from a single whale
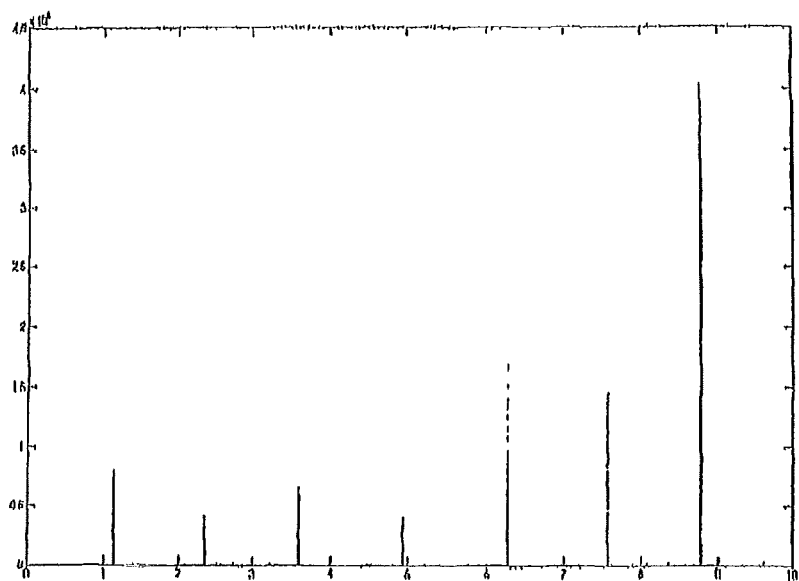
FIGURE 6.3: Magnification of figure 6.2 on an echo followed by a click
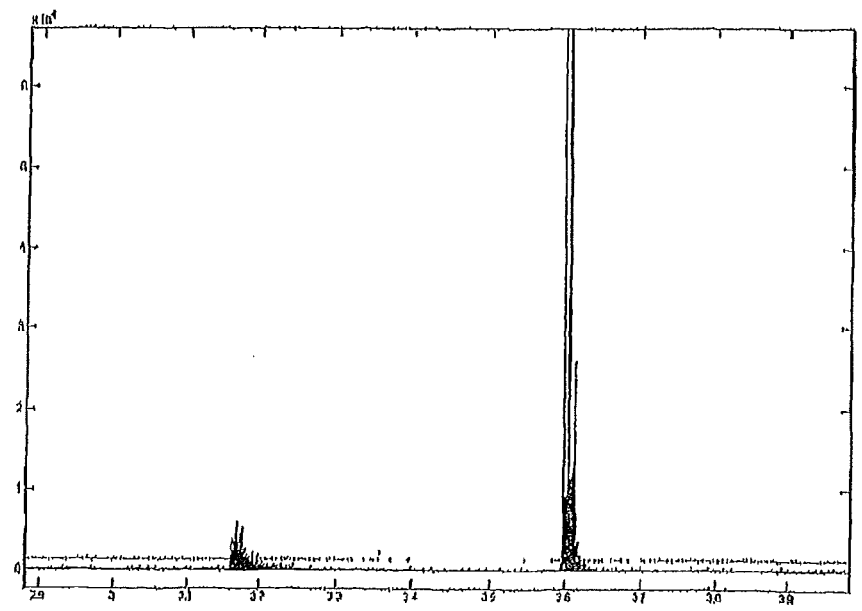

FIGURE 7: Calculation of TDOAs (Time Delay Of Arrival) – figure according to real signal from a single whale. The first five TDOAs kept are arrowed.
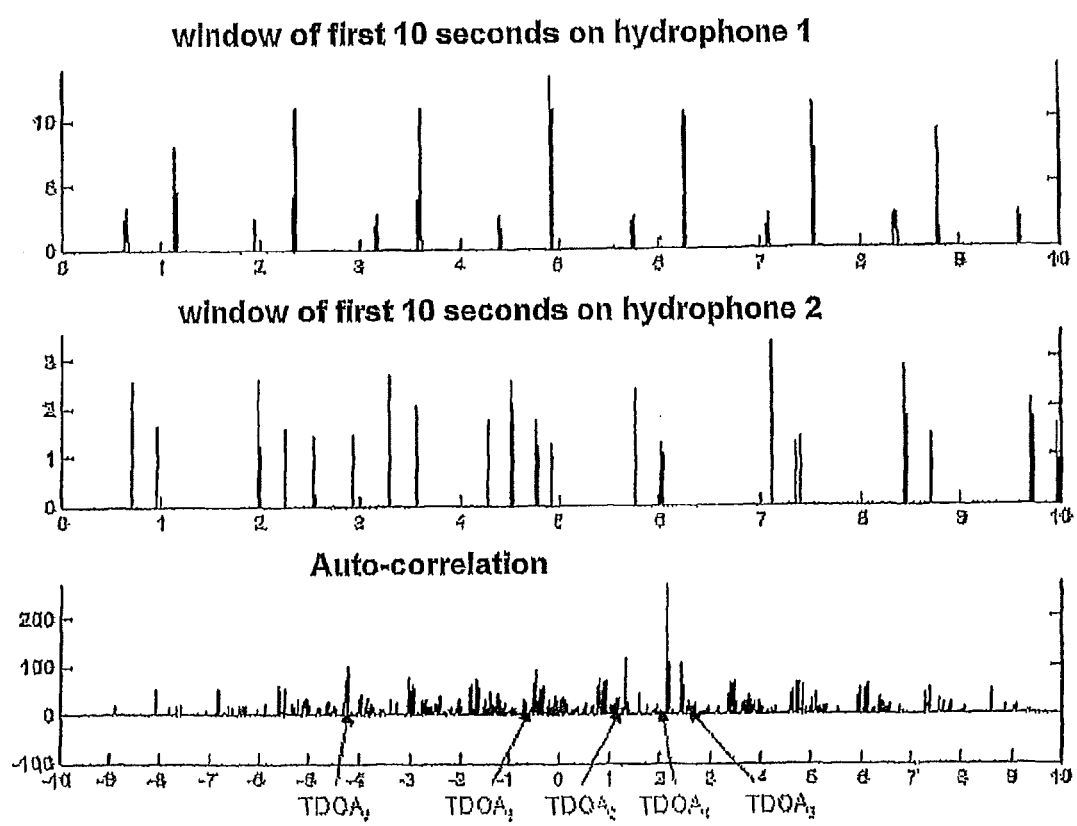

FIGURE 8.1: Effects/detection of echoes on signal in figure 7: the effects of echoes E(1) and E(2) are shown. Figure according to real signal from a single whale
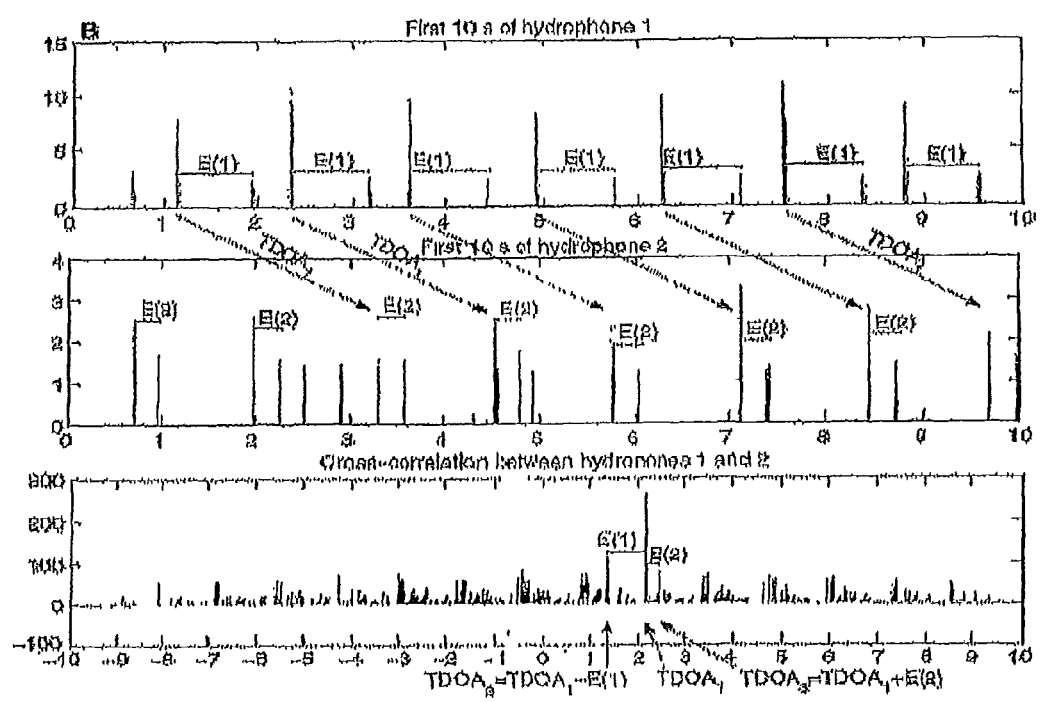

FIGURE 8.2: Absolute signal of an echo
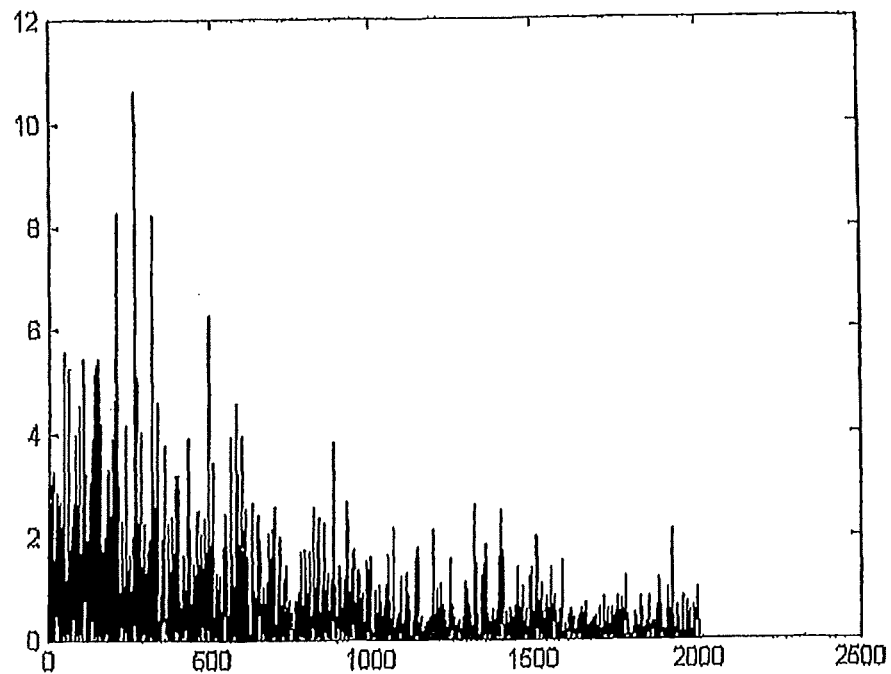
FIGURE 8.3: Signal of figure 8.2 averaged
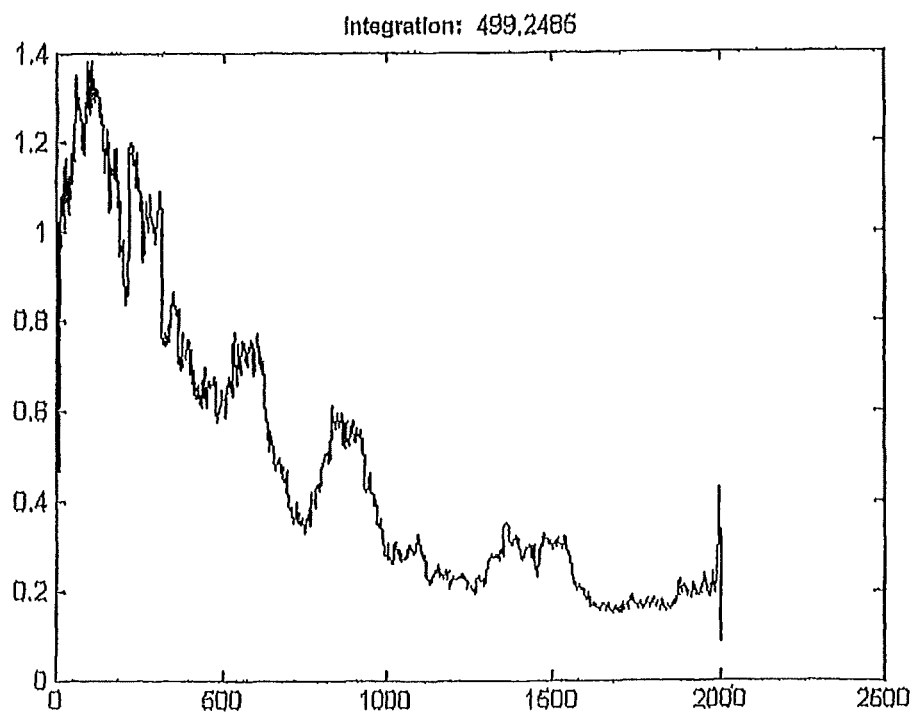

FIGURE 8.4: Absolute signal of a click
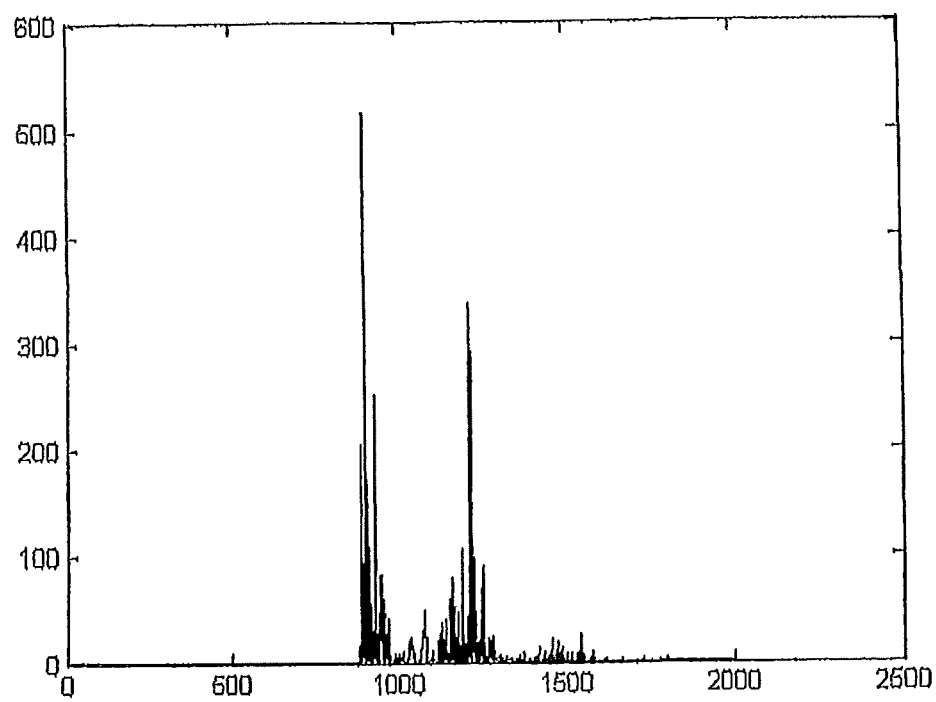
FIGURE 8.5: Averaged absolute signal of the click in figure 8.4
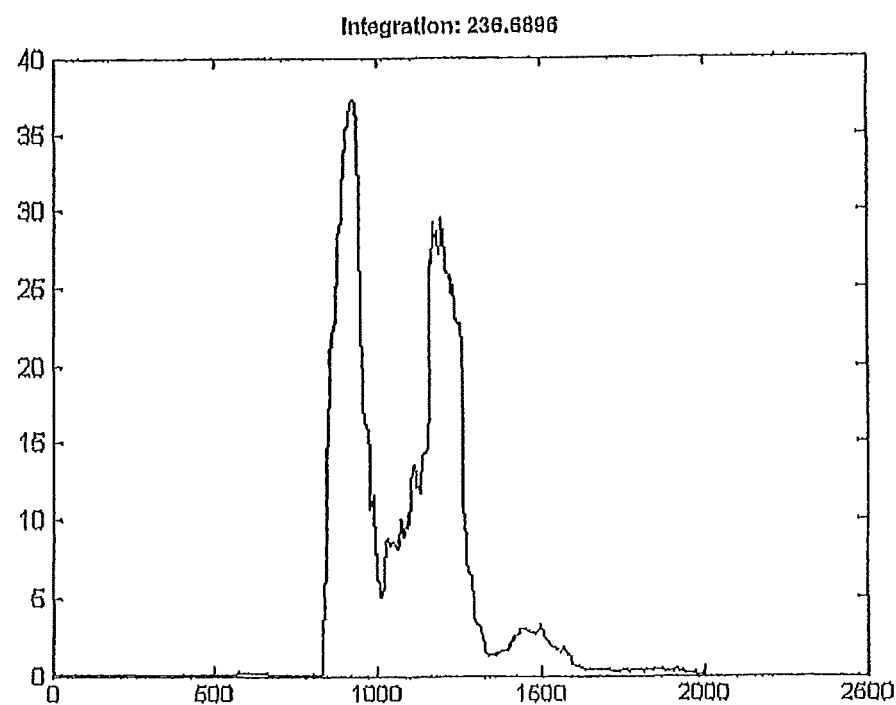

FIGURE 9: Raw signal: series of clicks from several whales with noise: real data recorded during 20 minutes by 4 hydrophones
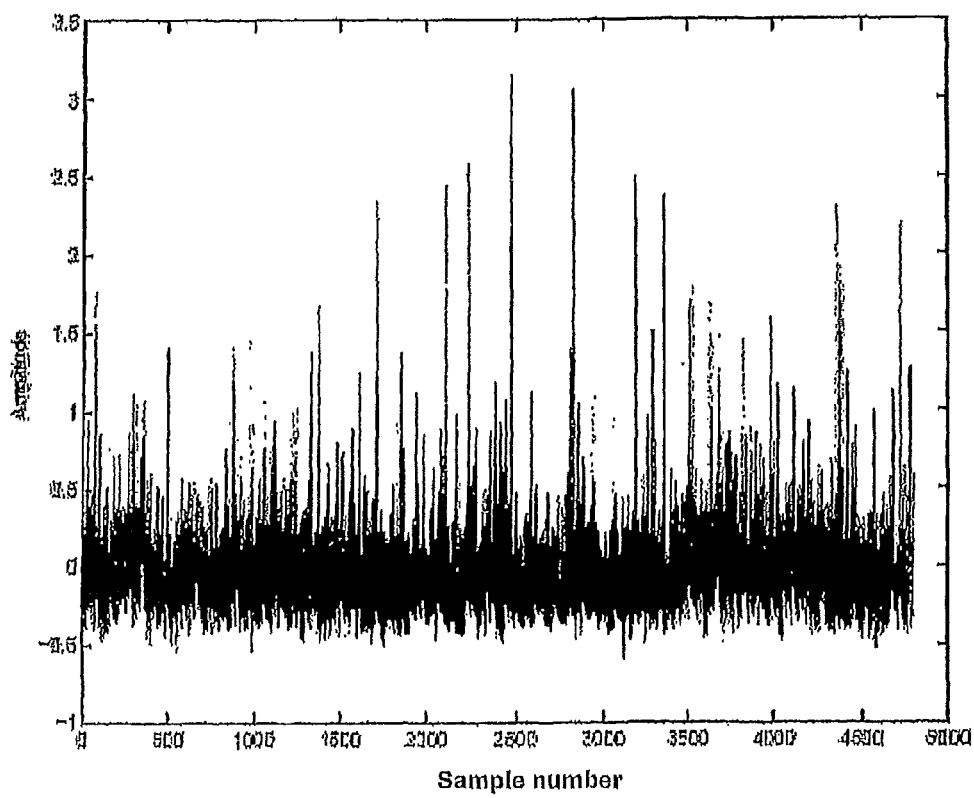

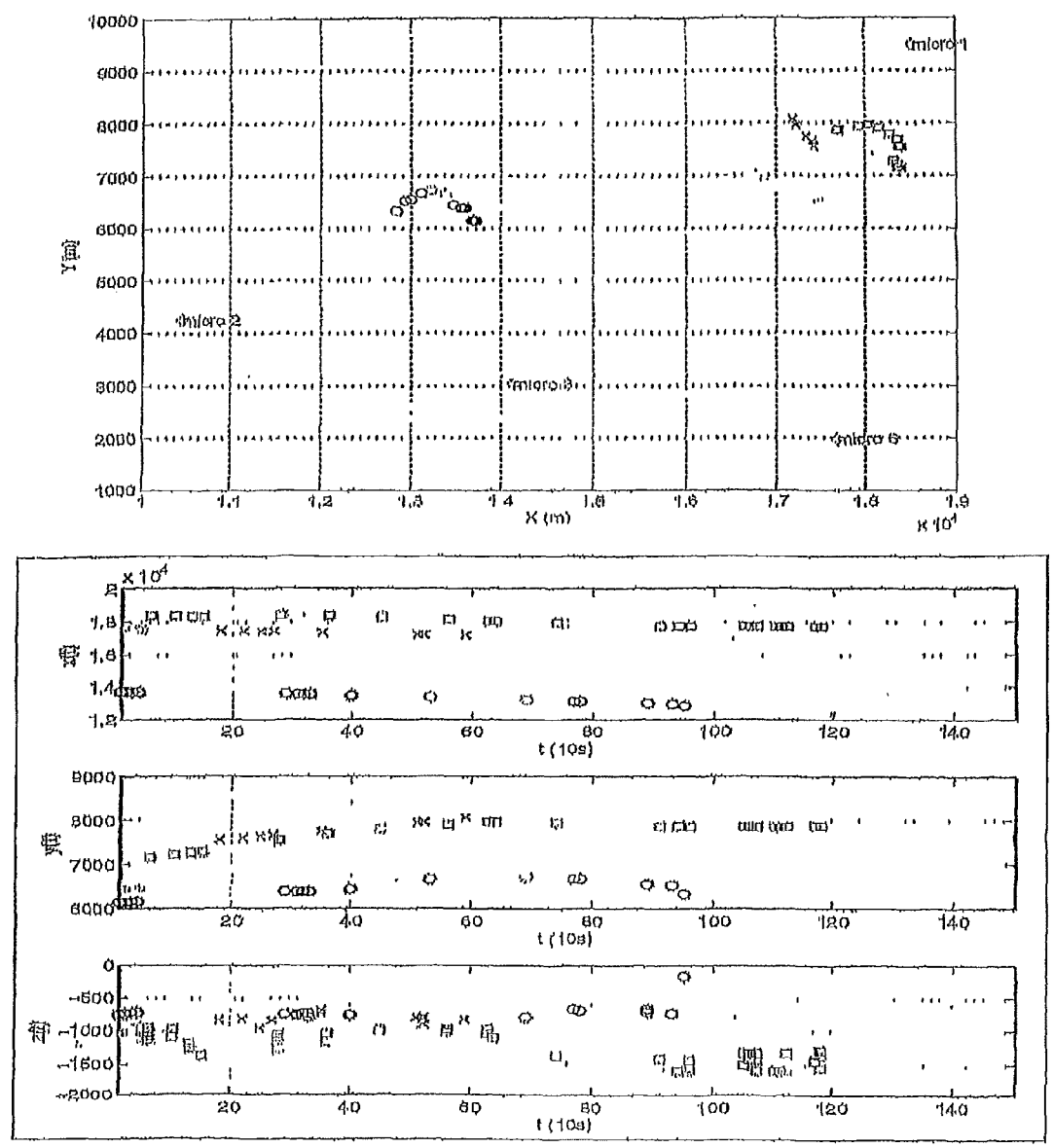
FIGURE 10: Positions calculated for nbTDOA=13, four whales are visible in (x,y,z). One difference symbol per whale identified. [Calculations made on real data during 20 minutes by four hydrophones] (with Teager-Kaiser Mallat filtering method).

FIGURE 11: Positions of 4 (or 5) whales in terms of (x,y,z) according to results with nbTDOA=35 [calculated on the real data identical to figure 10]. Change of nbTDOA from 13 to 35 increases the precision (with the TK Mallat filtering method).
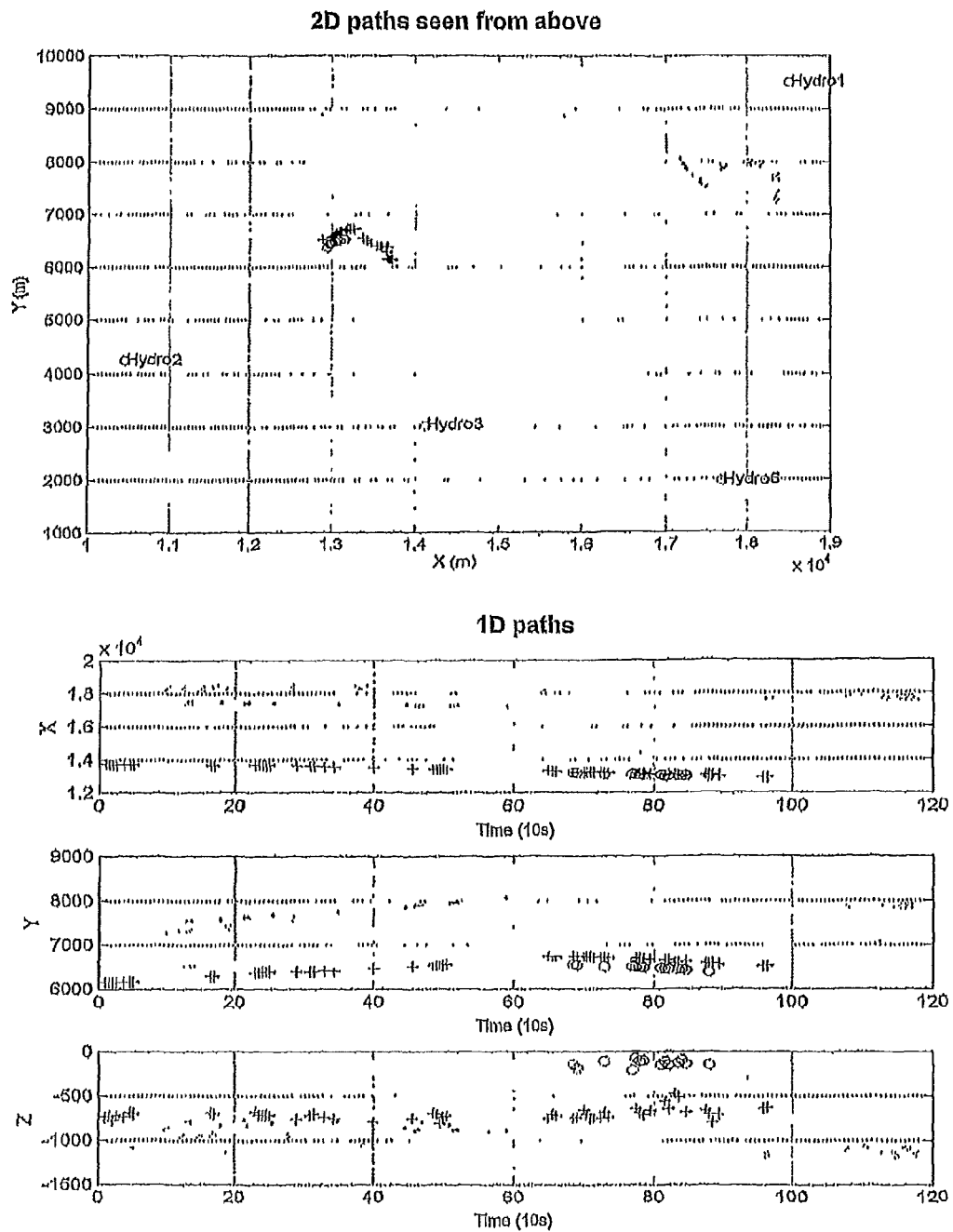

FIGURE 12: Representation of paths after smoothing (with TK Mallat filtering method)
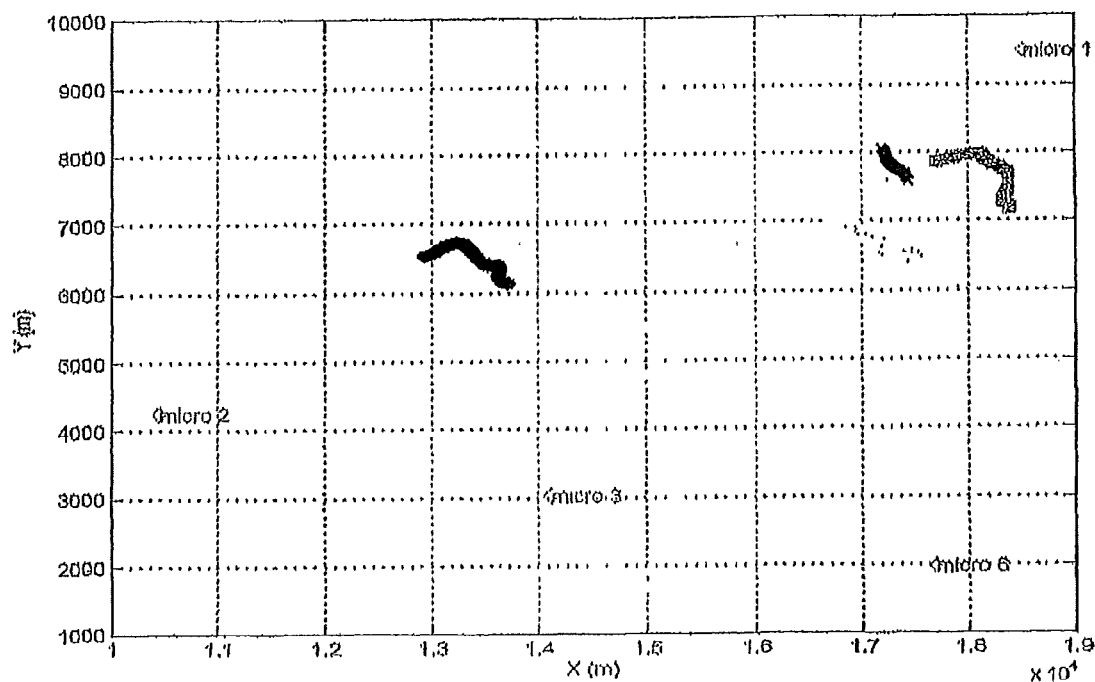

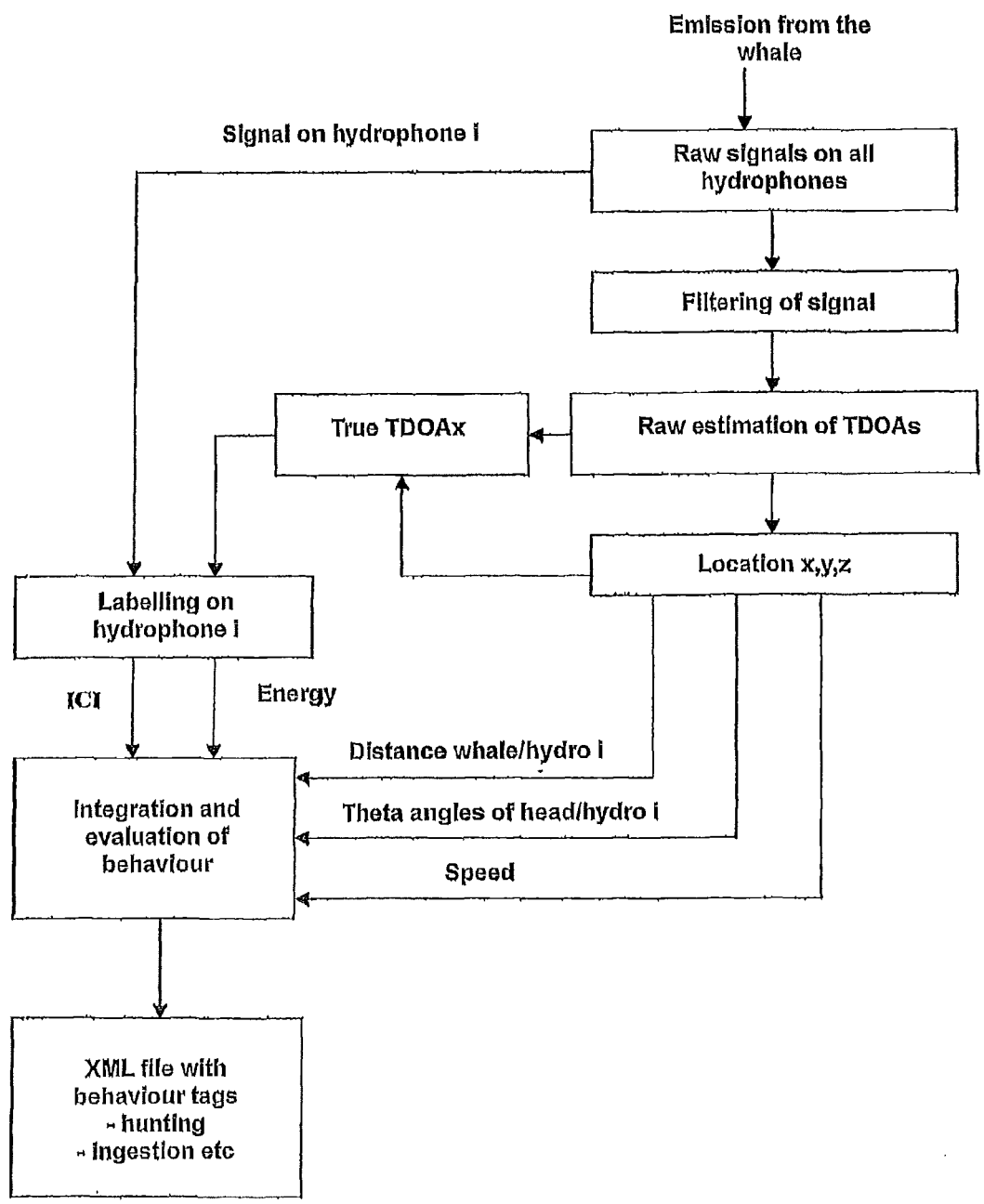
FIGURE 13: Application of the location of whales to the study of their behaviour

REAL-TIME ROBUST METHOD FOR DETERMINING THE TRAJECTORY OF ONE OR MORE CETACEANS BY MEANS OF PASSIVE ACOUSTICS, USING A LAPTOP COMPUTER

A robust method of tracking, in real time on a portable computer, one or more cetaceans, by passive acoustics The present invention concerns a method for the robust tracking of a plurality of X cetaceans by passive acoustics, using a set of Y sensors.

By extension, the present invention concerns a method of tracking, passively, one or more sources moving in any environment and emitting a non-stationary signal.

By way of concrete example, the invention will be described in the context of its application to the problem of the detection of marine mammals capable of emitting signals in the form of clicks, but naturally the invention applies to other types of non-stationary signal source and to other propagation media.

PRIOR ART

Several methods of monitoring paths of cetaceans are already known in the prior art. Active detective methods are generally distinguished, which consist of sending a signal, in particular an audible signal to the source and capturing the echo of this signal when it encounters the source. These methods are not recommended since the power of the signal is detrimental both to the cetacean sought and to its environment.

There are also passive detection methods, which consist of simply capturing signals with adapted sensors (in the case of cetaceans it is a case of audible signals that can be captured by means of submerged hydrophones), and then the signals received are processed with a view to determining the characteristics and position of the source.

Passive detection methods are much more satisfactory in their principle (no disturbance of the environment) but there is in the prior art no industrial product capable of providing this type of detection, neither in real time nor on a personal computer, of a plurality of sources emitting clicks. Consequently the only passive on-site detection method used at the present time is the visual counting of cetaceans when they surface. It will be understood that, having regard to the relatively short duration of the time during which cetaceans surface compared with the immersion time, this method is very incomplete and full of gaps and does not make it possible in particular to detect cetaceans on a possible collision course with a ship.

Other attempts have been made to develop a method detecting cetaceans passively, on the basis of algorithms for processing differences in times of arrival at the hydrophones of clicks captured by hydrophones, these differences being called "TDOAs", the acronym for "Time Difference Of Arrival".

Among the methods tried, there are the so-called detection algorithms of Morissey et al, that of Nozal and Frazer, or that of White et al, which have all been abundantly described in the scientific literature.

DRAWBACKS OF THE PRIOR ART

In summary, the aforementioned methods all comprise at least one major drawback among the following list:

- either it is a case of methods that are not passive and consequently require the sending of signals to the cetaceans, which are active methods and detrimental to the animals;
- or they are not produced industrially, and require the assistance of visual methods when the cetaceans rise to the surface, and all function only for the approximate monitoring of a single isolated cetacean and therefore under ideal acoustic conditions;
- or they require a speed profile of the sound in the sea water at the detection point, and these profiles are generally not available, or they are not up to date, the speed of sound varying according to the weather and seasons, which falsifies the results of the known detection methods;
- or they have recourse to very cumbersome signal processing algorithms (time frequency for example), requiring high calculation power, and this is the case with the algorithms cited above, which means that the detection even of a single whale cannot be done in real time or quasi-real time.

AIMS OF THE INVENTION

One aim of the invention is consequently to propose a method of detecting and tracking cetaceans passively that is in a position to solve the stated problems by the methods known in the prior art.

In particular, one aim of the invention is to propose a method and system that make it possible to track and count cetaceans, even in groups, and to identify them, which involves separating the signals of several cetaceans emitting clicks simultaneously in an area of several cubic kilometers.

Another aim of the invention is to obtain the aforementioned result without needing a profile for the speed of sound in water.

Another aim of the invention is to propose a detection method that affords rapid detection in real time.

Another aim of the invention is to propose a detection method that is easy to implement in practice, even with low-cost equipment.

Another aim of the invention is to propose a detection method and system that are robust to echoes and give precise and reliable results whatever the environment and the sources in question.

An additional aim of the invention is to propose a passive detection method and system that allow application to the labelling of acoustic emissions of animals, which must allow refined study of their characteristics such as their size, sex, age, group, dialect and behavioural interactions.

To this end, the subject matter of the invention is a passive tracking method as defined in the claims, and a system for implementing such a method.

The features and advantages of the invention will emerge from reading of the detailed description of the accompanying drawings, in which:

FIG. 2 illustrates the principle of the transitivity of the TDOAs;

Figure 1:
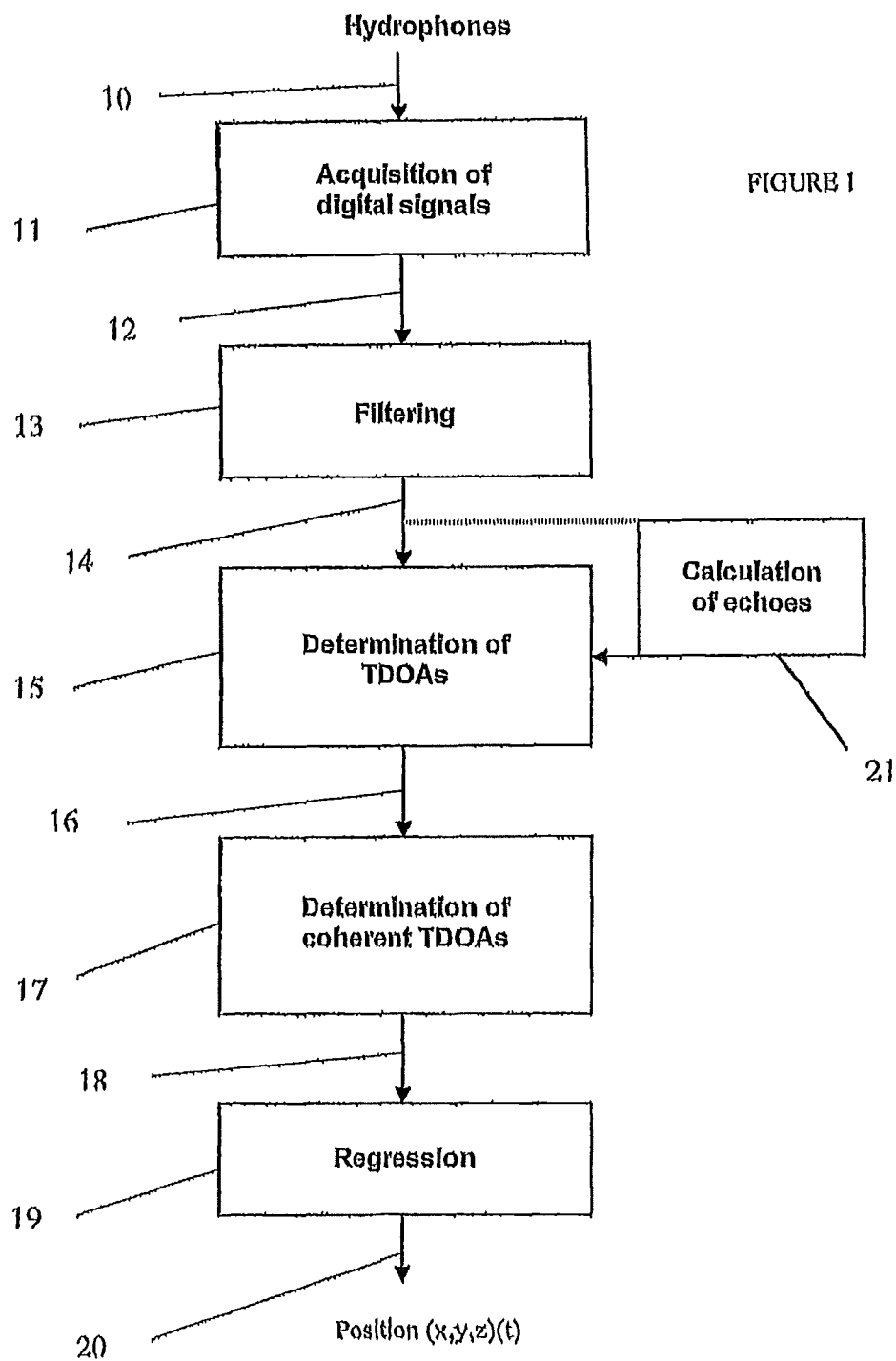
FIG. 1 illustrates a general flow diagram of the tracking method according to the invention.

FIGS. 3.1, 3.2 and 3.3 show respectively a click of a single whale on the raw signal, this same click after filtering with the Teager-Kaiser operator and finally the click after filtering and decimation;

FIGS. 4.1 and 4.2 show respectively the raw signal corresponding to several clicks of a single whale, before and after filtering by Teager-Kaiser, but without decimation processing;

FIG. 5 shows a signal in FIG. 4.1 after a filtering step according to the Teager-Kaiser algorithm and decimation;

FIG. 6.1 shows the signal of FIG. 4.1 after an additional filtering step according to the Mallat algorithm followed by a square root operation on the signal;

FIG. 6.2 shows the signal of FIG. 1 after a stochastic filtering (ASF);

FIG. 6.3 shows the signal of FIG. 6.2 after magnification of a click and of an echo;

FIG. 7 illustrates the principle of calculating the TDOAs by intercorrelation, on the basis of the actual signal of a single whale;

FIG. 8.1 illustrates the principle of detecting echoes by intercorrelation, applied to the signal of FIG. 7;

FIG. 8.2 illustrates the absolute signal of an echo;

FIG. 8.3 illustrates the signal of FIG. 8.2 averaged;

FIG. 8.4 illustrates the absolute signal of a click;

FIG. 8.5 illustrates the signal of FIG. 8.4 averaged;

FIG. 9 shows a raw signal received from the hydrophones, containing series of clicks from several whales, with noise;

FIG. 10 shows the successive positions in terms of (x,y,z) and in plan view as a function of time of four whales detected according to the method of the invention, for a first number of TDOAs kept;

FIG. 11 shows the successive positions in terms of (x,y,z) and in plan view as a function of time of four whales detected, for another number of TDOAs kept;

FIG. 12 shows the paths of FIG. 12, after a smoothing step;

FIG. 13 shows a flow diagram of the method for using the obtained positions of the whales, for the behavioural study thereof.

PRINCIPLE OF THE INVENTION

Reference is made to FIG. 1. This figure shows a functional flow diagram of the method according to the invention. Several hydrophones being disposed in the water in the area where it is wished to detect the presence and position of cetaceans, the analogue signals delivered by the hydrophones are captured at 10 in a known fashion. These signals correspond to the various acoustic signals and noise present in the environment. The step 11 of acquiring and digitising the signals coming from the hydrophones is performed for example by means of electronic acquisition cards connected to a computer, in particular a conventional portable computer. However, it is also possible for each hydrophone to be directly provided with means of digitising the acoustic signals, in which case the signals received from the hydrophones would be digitised signals, directly usable by a computer.

The invention provides for the digital signals delivered at 12 to a computer to be subjected to a special filtering step 13, which a view to isolating the useful signal due to the clicks from the background noise. This special filtering step is critical for the functioning of the method according to the invention and will be described in further detail below.

At the output 14 from the filtering step 13, a clean signal is recovered, devoid of noise, and the peaks of which correspond to the series of clicks emitted by any whales present in an area being monitored.

It is possible however that some of the peaks of the signal 14 may correspond to echoes of the clicks from the whales by reverberation on the surface of the sea or on the sea bed for example. In a more improved optional variant, the method according to the invention provides at step 21 a step of calculating and eliminating the echoes.

From the clean signal containing the peaks corresponding to the series of clicks from the whales, the TDOAs of the clicks are determined at 15, which makes it possible to obtain at 16 a set of TDOAs of the clicks from the whales but without its yet being possible to state which TDOAs correspond to the same source, which would make it possible to locate this source by a triangulation/regression method.

It is consequently necessary to provide a step 17 consisting of determining, among the TDOAs available at 16, those that are consistent with each other, that is to say those that comply with the principle of transitivity of the TDOAs, which will be stated in more detail in relation to FIG. 2. All the above steps are performed on ten-second windows with an overlap of the windows of p % (p being able to range from 0% to 95%, in the examples presented p=50%).

At the output 18 of step 17, a set of TDOAs consistent with each other is available, which are subjected to a non-linear regression step for determining at 19 the instantaneous positions (x,y,z) of each whale as a function of time. These raw positions are available at 20 at the end of the processing method according to the invention. As will be seen subsequently in relation to FIG. 11, obtaining the spatial positions of the whales on the three axes x,y,z for certain windows makes it possible to apply additional processing phases to these positions such as the smoothing of the paths with a view to better displaying in real time the paths of the whales present in the observation area.

Reference is made to FIG. 2, illustrating the principle of transitivity of the TDOAs. This figure shows a source S emitting an audible signal. In the example chosen to describe the invention, this audible source S is a marine mammal and the audible signal is a click. Four hydrophones i, j, k, h have also been shown. The propagation time of the click for reaching each of the hydrophones i, j, k, h has been denoted respectively $T_i$, $T_j$, $T_k$, $T_h$. In addition, the difference in propagation time $(T_j - T_i)$ of the audible signal to reach the hydrophones i and j has been denoted TDOA(i,j).

The audible signal producing spherical waves, the TDOA must satisfy a transitivity equation. Thus, in FIG. 2, for a signal emitted by the source S and reaching the hydrophones i, j and k, there must be the equation:

$$\text{TDOA}(i,j) + \text{TDOA}(j,k) = \text{TDOA}(i,k) \quad (1):$$

It can be seen that, with an array of four hydrophones i, j, k, h capturing the click from the same source, there are $C_4^2 = 6$ TDOAs possible. It is possible to choose, from these 6 TDOAs, three independent TDOAs. The others are linear combinations of the latter (see equations (1), and FIG. 2).

The invention uses the transitivity of the two TDOAs in order to:
 select the sextuplets of TDOAs satisfying the four equations (1) to verify that they do indeed come from the source:
 keeping only 3 independent TDOAs out of the 6 selected in order to locate the source.

Filtering of the Signal:

Reference is made to FIG. 9, which shows the raw signal before filtering, comprising several peaks corresponding to clicks of several whales. It is therefore clear that a raw signal of this nature is very difficult to interpret and it is not known in particular whether the various peaks correspond to clicks from the same whale.

Whereas in the presence of a single whale (FIG. 4.1) clear peaks easy to identify are obtained in the presence of several whales, the clicks from the whales furthest away and the least directive will generate peaks of low amplitudes that will merge with the noise. To keep the clicks from the whales furthest away from the hydrophones, it is consequently necessary to eliminate the noise, which justifies additional filtering. The original method enabling such processing forms part of the present invention.

As indicated above, the signals that will make it possible to track the cetaceans are called clicks. FIG. 3.1 shows the details of a click sampled at 48 kHz. The clicks are high-frequency signals at high levels (up to 200 dB re: 1$^{it}$ Pa) that the cetaceans emit for echolocation and communication. They are in general emitted in series as in FIG. 4.1.

As can be seen in FIG. 3.1, the amplitude of a raw click as a function of time shows that the structure of this signal reveals several peaks: this is a fairly complex high-frequency signal, which superimposes an HF noise and an HF signal. These signals, when recorded on hydrophones, have an additive background noise that results from various noises (state of the sea (Gaussian SSL), biological signals, boats and molecular turbulences), which prevents processing the raw data without passing through a filtering step. However, it is not possible to filter a click in a simple manner in order to extract the signal by means of a basic filter such as a low-pass or high-pass filter, since a filter of this type would reduce both the signal and the noise.

To solve this difficulty, a prefiltering step is carried out according to the invention consisting of applying the Teager-Kaiser energy operator to the raw signal.

The Teager-Kaiser operator in continuous mode is defined thus:

$$\Psi[x(t)] = \left(\frac{dx(t)}{dt}\right)^2 - x(t)\frac{d^2 x(t)}{dt^2} = \dot{x}^2 - x\ddot{x}, \quad (2)$$

where x(t) is the value of the signal at time t.
In discrete terms, this gives:

$$\Psi[x(n)] = x^2(n) - x(n+1)x(n-1), \quad (3)$$

where x(n) is the $n^{th}$ sample.

One of the advantages of this operation is that, at each instant, only three samples are necessary for evaluating the energy. It is a high-frequency filter and therefore the filtered result will be of high frequency.

Considering the signal recorded on the hydrophones as:

$$s(n) = x(n) + y(n) + u(n). \quad (4)$$

where s(n) is the recorded signal, x(n) the signal of interest, y(n) an interference signal, u(n) a background noise from the ocean assuming that it is Gaussian stationary in the broad sense over a short duration, by applying the operator of TK to s(n), this $$\Psi[s(n)] = \Psi[x(n)] + \Psi[y(n)] + \Psi[u(n)] + T[n]. \quad (5)$$

gives:
where T[n] is the sum of all the terms between the possible pairs of components (x(n), y(n) and u(n)). For example, the term $\psi_c$ between x(n) and y(n) is defined by:

$$\Psi_c[x(n), y(n)] = x(n)y(n) - x(n+1)y(n-1) \quad (6)$$

Taking into account the high-pass character and statistical behaviour of the operator, it is shown that the result of equation (6) is approximately given by:

$$\Psi[s(n)] \approx \Psi[x(n)] + w(n). \quad (7)$$

where w(n) is a Gaussian process. The output is then dominated by the energy of the clicks while having a Gaussian additive noise.

The Teager-Kaiser operator is applied to each ten-second window of each hydrophone. FIG. 3.2 shows the result when the operator is applied to a click and FIG. 4.2 shows the result on a raw signal like the one in FIG. 4.1.

Moreover the background noise has been made Gaussian by means of the Teager-Kaiser operator.

According to the invention, the following filtering step consists of performing a decimation step taking the mean of the signal over several windows.

The sampling can be of several tens of kHz and, the duration of a click being approximately 20 ms, a decimation is first of all carried out by a factor of N by averaging the N adjacent samples in order to obtain a simple representation of the click. This decimation will have the effect of reducing the temporal precision of the peaks to N/Fe where Fe is the sampling frequency and to reduce the variance of the noise by a factor of N.

FIG. 3.3 shows the detail of a click decimated by a factor of 100 (sampling frequency of the raw signal=48 kHz). A simple representation of the click is obtained so that, from a time point of view, it resembles a peak. This decimation also reduces the size of the data since the subsequent filtering must take into account fewer data, which helps to significantly reduce the calculation time compared with the other techniques.

FIG. 5 shows the result of the decimation on this ten-second window on a series of clicks like the one in FIG. 4.1. The samples are less numerous and the clicks are clearly identified by peaks, and consequently additional filtering is not necessarily required in the case of a single whale, the noise component being reduced.

Mallat Algorithm:

To eliminate the residual noise, the invention makes provision for using the Mallat algorithm. This is because it is known that this makes it possible to denoise the signals having Gaussian additive noise. The aim here is to filter the signal in order to eliminate the Gaussian noise while keeping the information, that is to say the clicks.

Let us state first of all the principle of the algorithm. The Mallat algorithm describes a discrete wavelet transformation using multiresolution analysis. This consists of decomposing the signal on a high-frequency level and a low-frequency level. This decomposition is carried by means of two filters, g and h, which form a so-called Haar base:

$$h = \frac{[1 \ 1]}{\sqrt{2}}, \text{ and } g = \frac{[1 \ -1]}{\sqrt{2}}, \quad (8)$$

The h filter is a low-pass filter, and g a high-pass filter, both having the same cutoff frequency. These are conjugate mirror filters. They make it possible to calculate the decomposition of a signal in an orthonormed wavelet base. The signal to be analysed γ is represented by a set of details $d_j$ and an approximation that corresponds to the last resolution, and this is called the wavelet representation of the signal. It has been shown that the high-amplitude wavelet coefficients have a favourable signal to noise ratio and conversely. This property is used to eliminate the noise in our decomposed signal. After having applied the Mallat algorithm to a signal output from the Teager-Kaiser operator to ten-second windows (N=4800), a Gaussian noise h, reduced and centred of the same size, is generated and decomposed in the same way. The variance a $\sigma_{B,n}$ of the coefficients $B_{i,n}$ of the detail plane n of the previous noise h is calculated, and a so-called universal thresholding is applied to each coefficient $C_{i,n}$ of each detail plane n of the signal with $$C_{i,n} = \begin{cases} C_{i,n} & si |C_{i,n}| > thres * \sigma_{B,n} * \sigma_N, \\ 0 & \text{otherwise} \end{cases} \quad (9)$$

where thres is the thresholding coefficient and $\sigma_N$ the variance of the noise in the ten-second signal. To estimate $\sigma_N$ the variances of the raw signal (that is to say the signal of interest plus the noise) are calculated, preferably on windows of 100 samples overlapping to 80%.

$\sigma_N$ is considered to be the maximum likelihood of the variances previously calculated. The maximum likelihood is a method that consists of taking the most probable estimation of variance among the different variances calculated. For this purpose the mean of the variances that have appeared most is taken. This makes it possible to dispense with selecting by hand a portion of the signal without any signal of interest. This is because the noise is different on each hydrophone and changes over time, and it would be too tedious to make a manual selection. The variance of a click being great, and given the size of the variance estimation windows, the duration of a click, and the number of clicks per window (1 click per second on average for a whale), the maximum likelihood of the variances calculated has the greatest probability of being $\sigma_N$.

In the literature, numerous variants of the coefficient thres are proposed according to the type of data that are processed. Here use is made of so-called universal thresholding (which makes our method completely base independent), which consists of using:

$$thres = \sqrt{2 \cdot \log e(N)}. \quad (10)$$

where N is the number of wavelet coefficients in the thresholded plane.

Finally, after having performed the thresholding step, the denoised signal is reconstructed. The Mallat algorithm makes it possible, advantageously in the case of several whales, to keep the secondary peaks, that is to say those very close to the noise, while eliminating the latter. Next the square root of the signal at the output of the Mallat algorithm is taken, the transitivity of the TDOAs is verified in order to obtain coherent triplets and a non-linear regression is performed. In this way several position points x,y,z(t) are obtained for each whale, as shown in FIG. 10.

As an alternative with respect to a filtering step 13 using Teager-Kaiser and Mallat algorithms, a variant of the invention provides for an adaptive stochastic filtering, hereinafter denoted ASF.

Adaptive stochastic filtering (ASF) is a filtering method that is used here for detecting clicks.

Here a click is considered to be a Gaussian random signal, just like sea noise.

Let A be the variance-covariance matrix of a click and B that of sea noise. The vectors of the ASF are then the inherent vectors of the matrix $B^{-1}A$. The filtering consists of selecting the inherent vector corresponding to the largest inherent value of the matrix $B^{-1}A$ and multiplying this inherent vector by the signal, on sliding time windows. In this way a signal filtered by the ASF is obtained. The filtered signal is called a functional, an example of which is shown in FIG. 6.2, which is the result of the ASF filtering applied to the series of clicks in FIG. 4.1. To distinguish these clicks in the filtered signal, it is necessary to choose a detection threshold. All the values above this threshold are considered to correspond to the presence of a click.

The detection thresholds are evaluated by means of the variance of the noise and the ORC (Operational Reception Characteristic) curves of the detector in order to have a false alarm level of for example 1%.

Calculation of the TDOAs, According to Step 15 in FIG. 1:

A good estimation of the TDOAs requires first of all filtering, and this is the reason why the invention makes provision for using a filtering of the Teager-Kaiser operator type followed by the Mallat algorithm, or an adaptive stochastic filtering, as described above. This good filtering will give rise to sharper TDOA peaks on the intercorrelograms, which, combined with the recovery of a large number of TDOAs, will give multiple path estimations, which are not provided by the methods of the prior art.

Reference is made to FIG. 8. The signals from the various hydrophones are intercorrelated on ten-second windows in order to estimate the time differences in arrival at the hydrophones (Time Delay Of Arrival, ie TDOA).

FIG. 8 shows the example of signals after filtering by Teager-Kaiser and Mallat, for hydrophones 1 and 2. The filtering output signals in the case of a whale are therefore seen, detected by two hydrophones, namely hydrophones 1 and 2.

The basic algorithm for determining the TDOAs that correspond potentially to clicks is the one known as Glotin-Giraudet: the TDOAs are calculated by intercorrelating the ten-second windows of each pair of hydrophones. They are used for non-linear multiple regression in order to estimate the positions of the path or paths.

In theory the position on the x-axis of the highest peak corresponds to the TDOA of the click of a whale, that is to say $TDOA_1$ in FIG. 8. There is only one real TDOA per pair of hydrophones and per whale. In the event of the presence of clicks from several whales, there are as many real TDOAs as there are whales. However, in order to ensure that there is, among the various peaks, the one that corresponds to the clicks of a whale, preferably several TDOAs are recorded.

In FIG. 7 we show 5 TDOAs, but the method in this patent makes it possible to keep up to 15 TDOAs per analysis window, while remaining in real time, or even up to 35 TDOAs if the calculation power available so permits.

Thus n(5=<nbTDOA=<35) TDOA (i,j)=$T_j-T_i$ of the hydrophones (i,j) are calculated while keeping the value of the time corresponding to the nbTDOA values that are highest in the intercorrelogram, for each pair of hydrophones. The precision of each TDOA is relative to any decimation operation (in our example it is ±2 ms).

As shown at the bottom of FIG. 7, the intercorrelogram of the two signals gives peaks, a quantity of which corresponding to nbTDOA is kept. In the case of a whale, it is thus possible to recover the true TDOA given the good quality of the data. For each peak, the value on the x-axis is looked at, which is the difference in time between two hydrophones, which may be positive or negative according to the hydrophone taken as a reference.

In order to clearly detect several whales, which is an important aspect of the method, it is necessary to record a maximum number of potential TDOAs, that is to say the maxima of the windows of the intercorrelograms of each pair of hydrophones. A good compromise in value for nbTDOA between calculation time and informative content of the TDOAs may be taken at nbTDOA=15. Below this number, the risk of losing real TDOAs exists, and above this number the calculation time due to step 17 of determining the coherent TDOAs described hereinafter becomes problematic for ensuring a real-time calculation with a simple personal computer.

It should be noted that the case with one or more whales (the number being unknown at the start) is not distinguished a priori. By default therefore, and if the PC is suitable, nbTDOA is taken equal to 15.

There is therefore at the output 16 in FIG. 1 a number nbTDOA of times that are potential TDOAs, to which there will be applied a step 17 of determining, among these potential TDOAs, those that are coherent with each other, as will be described below.

However, before the determination of the coherent TDOAs, the invention makes provision optionally for a step of detecting and eliminating echoes, consisting of eliminating the TDOAs generated by the echoes due to the reflections on the surface of the sea and the seabed.

Elimination of TDOAs Due to Echoes, According to Step 21 in FIG. 1:

Reference is made to FIG. 8. According to a first method of eliminating echoes, autocorrelation of the signals from several hydrophones is carried out.

There is an echo for each peak (in the case of a whale and when the signal is clean), and the difference in time between the peak and the echo is denoted E(i), where i is the $i^{th}$ hydrophone. There can be seen at the top of FIG. 8 the echo E1 with respect to hydrophone 1 and at the bottom echo E2 with respect to hydrophone 2.

An autocorrelation of each hydrophone signal is then carried out. The highest secondary lobe is taken and, if it reaches a certain proportion ($\frac{1}{5}^{th}$) with respect to the principal peak that corresponds to the energy, the value on the x-axis of the secondary peak is the value E(i) of the echo for the hydrophone i. In the contrary case, it is considered that there is no echo. Thus, knowing the echoes E(i), it is possible to identify the TDOAs generated by the echoes in order to eliminate these TDOAs.

The TDOAs satisfying one of the following equations (11) with respect to the $TDOA_1$ are therefore eliminated as being due to echoes:

$$TDOA_x(i,j)-TDOA_1(i,j)=k*E(i)\pm0.002, k=\{1,2\}, x\in\{2\ldots nbTDOA\}$$

$$TDOA_x(i,j)-TDOA_1(i,j)=-k*E(j)\pm0.002, k=\{1,2\}, x\in\{2\ldots nbTDOA\} \quad (11)$$

According to an alternative method, it is possible to proceed with the elimination of the echoes by using one of the properties of the echoes, which is the fact that they are extended in time (see for example the echo shown at FIG. 8.2, which extends over 2000 samples of the signal), because of the different layers of water through which the reflected signal passes, which delays certain frequencies. As can be seen by comparing FIGS. 8.2 and 8.4, the click and echo signals have very different profiles, in terms of duration and number of samples.

For this purpose, a signal portion of 30 ms is selected around each detection date, which corresponds potentially to a click or an echo.

As the absolute value of the echo signal varies very quickly, in order to detect and eliminate the echoes the following procedure is followed:

the envelope of the signal is determined. For this purpose, the absolute value of the signal is taken (filtered by means of one of the filtering methods described previously) and this absolute value is then averaged and standardised on windows of for example 100 samples (for 48 kHz), which reveals an envelope of the signal, as illustrated in FIG. 8.3 for an echo and in FIG. 8.5 for a click. It can be seen moreover that the shape of the envelope of a click is very different from that of an echo.

next this envelope is integrated (which amounts to calculating the area disposed under the envelope in FIG. 8.3 or FIG. 8.5), and the result (in this case an area of 499.2485 for the echo and a smaller area of 236.6896 for the click) is compared with a threshold predetermined experimentally.

having regard to the extension in time of the echoes with respect to clicks, the area of the envelope corresponding to an echo will be much greater than the area of a signal corresponding to a click. Consequently a person skilled in the art will easily be able to determine experimentally a threshold such that the envelope of the signals above this threshold corresponds to echoes (and the corresponding signals are eliminated), while the envelope of the signals below this threshold corresponds to clicks, and the corresponding signals are kept.

Other methods of eliminating echoes can also be used in the context of the invention. Thus it is possible to effect a wavelet decomposition of the signal, using in particular the so-called "matching pursuit" Mallat algorithm, which is available in a product called "Matching Pursuit Toolkit".

It will also be possible to make a signature search on the clicks, referred to as "signal matching" consisting of seeking for example maximum correlations with known click signals.

These two methods can be used in real time in a tool box called MPTK-IRISA.

In the end, the echo elimination methods mean that it is therefore possible to keep only the clicks in the signal, with complete elimination of noise.

Therefore in principle, after the calculation and elimination of echoes, the TDOAs generated by the echoes have been eliminated and consequently, among the remaining TDOAs, the true TDOAs corresponding to the whale clicks appear.

Determination of Coherent TDOAs, According to Step 17 in FIG. 1:

The principle consists of seeking the TDOAs that come from the same source, which consists of verifying the transitivity of the TDOAs. There are 4 hydrophones j, k, h. Therefore, for a given TDOA (i,j), there are a maximum of nbTDOAs=15 values (or fewer according to the eliminations that have been made during the above echo calculation).

Only the TDOAs that satisfy the four equations (12) below are kept, and the TDOAs that come from the same source are numbered in order not to mix the values during the regression provided for below.

To implement the coherence principle, a search is consequently carried out, on each ten-second window, for the sextuplets of TDOAs generated by the same source, that is to say verifying the coherence of their sums with each other. A quadruplet of hydrophones (i,j,k,h) locates the same source with the TDOAs (u,v, w,x,y,z) if the following four equations (12) are satisfied:

$$TDOA_u(i,j)+TDOA_v(j,k)=TDOA_w(i,k)\pm er,$$

$$TDOA_u(i,j)+TDOA_x(j,h)=TDOA_y(i,h)\pm er,$$

$$TDOA_w(i,k)+TDOA_z(k,h)=TDOA_y(i,h)\pm er,$$

$$TDOA_v(j,k)+TDOA_z(k,h)=TDOA_x(j,h)\pm er, \quad (12)$$

where er is equal to three times the uncertainty caused by the decimation of the raw signal (in our example er=3*0.002=0.006).

In the method according to the invention, it is in fact possible to have nbTDOA ranging up to 35 while keeping a real-time processing on a computer of the PC type. This is because, by taking the entire system (12) composed of four equations (from 1 to 4), each TDOA having nbTDOA possible values, there is a number equal to nbTDOA^6 verifications of the system. An interesting aspect of the method consists of satisfying first of all the first equation for all the values of TDOA that make it up, which makes a calculation in terms of nbTDOA^3. For each of equations 2, 3, 4, they are satisfied only in the case where the equation preceding them is satisfied. The calculation time is thus considerably reduced, which then responds to a complexity between nbTDOA^3 and nbTDOA^6. A saving in calculation time by a factor of more than 100 compared with a direct analysis version is then made.

The sextuplets of TDOA(u,v,w,x,y,z) not complying with the system of equations (12) are eliminated as not being coherent.

For four hydrophones, three independent TDOAs are selected, in relation to a hydrophone. There are therefore obtained at the output 18 of step 17 of FIG. 1 three independent TDOAs, which are next used in step 20 for calculating the position of the source of emission of the clicks, by minimisation of the least squares error function on the position, as explained below.

Calculation of the Instantaneous Position Xs(t) of the Source of Clicks:

For this purpose a non-linear multiple regression is performed according to step 19 in FIG. 1, by means of the Gauss-Newton algorithm, using for example a constant speed of sound in water of 1500 ms$^{-1}$. The position of the source is denoted $X_s$. The three independent TDOAs $\{TDOA_u(i,j), TDAO_w(i,k), TDAO_y(i,h)\}$ of each quadruplet of hydrophones (i,j,k,h) are used for minimising the LMS (Least Mean Square) error in the system of the following three equations:

$$Q(X_s,X_i)-Q(X_s,X_1)=TDOA_u(i,j)*c,$$

$$Q(X_s,X_i)-Q(X_s,X_k)=TDOA_w(i,k)*c,$$

$$Q(X_s,X_i)-Q(X_s,X_h)=TDOA_y(i,h)*c, \quad (13)$$

where $Q(X_s,X_a)$ is the Euclidian distance between the source of unknown coordinates $$X_s = \begin{bmatrix} x \\ y \\ y \end{bmatrix}_s$$

and the hydrophone of known coordinates $X_u$ and c=1500 ms$^{-1}$.

In detail, during the non-linear regression, the following function is minimised recursively:

$$\min_{X_s}(f(X_s))=f_1(X_s)^2+f_2(X_s)^2+f_3(X_s)^2, \quad (14)$$

where $$f_1(X_s) = \sqrt{\sum_{l=1}^{3}(X_s(l)-X_i(l))^2} - \sqrt{\sum_{l=1}^{3}(X_s(l)-X_j(l))^2} + d_{i,j},$$

$$f_2(X_s) = \sqrt{\sum_{l=1}^{3}(X_s(l)-X_i(l))^2} - \sqrt{\sum_{l=1}^{3}(X_s(l)-X_k(l))^2} + d_{i,k}, \quad (15)$$

$$f_3(X_s) = \sqrt{\sum_{l=1}^{3}(X_s(l)-X_i(l))^2} - \sqrt{\sum_{l=1}^{3}(X_s(l)-X_h(l))^2} + d_{i,h},$$

with $d_{i,j}=TDOA_u(i,j)*c$ the estimated TDOA between hydrophone i and hydrophone j, and $X_a$ the coordinates $$\begin{bmatrix} x \\ y \\ z \end{bmatrix}_a$$

of hydrophone a. The function is preferably minimised with the Levenberg-Marquardt technique. If the solution of (14) is $X_{estime}$, then the LMS error is written:

$$f(X_{estime})=f_1(X_{estime})^2=f_2(X_{estime})^2=f_3(X_{estime})^2 \quad (16)$$

A position X of the source of the clicks is considered to be correct when $f(X_{estime})<1$ in our example, or to a certain threshold in general terms, otherwise it is not taken into account.

Determination and Representation of the Paths of the Whales:

Reference is made to FIG. 10, which shows the successive positions of four whales on the axes x,y,z as a function of time, each whale being represented by a different symbol. Each resolution of the system (13) of three equations gives a single position Xs(x,y,z). As there are several sets of independent triplets of coherent TDOAs this system of equations is resolved for each set, which gives several points on FIG. 1 for each whale and each instant considered, both in plan view and in view along each axis x,y,z as a function of time.

FIG. 11 is equivalent to FIG. 10 with a higher number of TDOAs (35), and it can be observed that the paths in terms of x,y,z and also in plan view in the plane x,y are more precise.

Once the time windows are identified as participating in the convergence of a position Xs by regression, the method according to the invention extracts these windows and the clicks that are contained therein, and the labels using the values of TDOA as coming from the source situated at S. The space-time continuums of the positions make it possible to isolate individual paths and therefore to link clicks to a particular whale (by automatic clustering of the closest neighbour for example). It is known according to Laplanche et al that the form of the clicks identifies the age and sex of the whales and can serve to estimate the activity of the whale. The extraction of clicks in noise or several series of clicks from different whales therefore constitutes a very interesting process afforded by the invention.

Smoothing of Paths:

In the light of these results, a position is estimated, for each individual, several times a minute (once every 10 seconds in the ideal case). Consequently some zones do not have a point and form empty spaces in the paths. The limits of the system are then arrived at, the system not being able to estimate more positions since there is too much overlap of the clicks on certain detection windows. It will be possible to remedy this problem by smoothing the paths as shown in FIG. 12, according to smoothing methods known per se, for example a linear interpolation method.

Linear smoothing or smoothing by splines of the paths makes it possible to estimate the unknown positions of the whale between two passage points obtained (FIG. 10). This makes it possible to determine the TDOAs that would have generated these positions, since the position of the whale and the coordinates of the hydrophones are known. It is then possible to return to the recording and label the clicks on portions of the signal where the filtering and intercorrelations have not succeeded in extracting information.

Estimation of the Speed Profile:

The invention as described up till now assumes the use of four hydrophones and a constant speed profile of 1500 m/s. It should be noted that, with an additional hydrophone (that is to say at least 5 hydrophones) it is possible, by adding a degree of freedom to the equations (13), to estimate a speed profile characteristic of the environment at the time of recording. A speed profile model for the period concerned is then dispensed with. The fifth hydrophone adds a degree of freedom to the system and makes it possible to perform the regression for estimating the position vector of the source-speed θ on each ten-second window, with:

$$\theta = \begin{bmatrix} x \\ y \\ z \\ c \end{bmatrix} \quad (17)$$

The following system is then used:

$$Q(X_s, X_1) - Q(X_s, X_1) = TDOA_u(i,j)*c,$$

$$Q(X_s, X_1) - Q(X_s, X_1) = TDOA_w(i,k)*c,$$

$$Q(X_s, X_1) - Q(X_s, X_h) = TDOA_y(i,h)*c,$$

$$Q(X_s, X_1) - Q(X_s, X_1) = TDOA_v(i,l)*c, \quad (18)$$

where $Q(X_s, X_a)$ is the Euclidian distance between the source $$X_s = \begin{bmatrix} x \\ y \\ y \end{bmatrix}_s$$

and the hydrophone of coordinates $X_a$, $TDOA_u$ (i,j), $TDOA_w$ (i,k), $TDOA_y$ (i,h), $TDOA_v$ (i,l) the four independent TDOAs and c the norm of the speed of sound in the medium, which will be dependent on the recording time. Next c(t) is reinjected into the system of equations (13). The quality of the spatial estimations is then improved. Naturally the addition of supplementary hydrophones improves the quality of the results without dramatically reducing the speed of execution.

System for Implementing the Tracking Method According to the Invention:

In order to implement the method according to the invention, it suffices to use a standard computer provided with a hydrophone acquisition card and capable of executing software implementing the processing steps described above. In addition, four hydrophones are needed at a minimum (sampling at least 400 Hz in the case of the sperm whale), and spaced apart by from a few tens to a few hundreds of meters. They can be fixed and placed at the bottom of the sea or on a coast. However, they can also be disposed on ships, or derivable on the surface or in the water if a system of the GPS type is associated therewith. The recordings must be of several minutes in order to take into account the movement of the cetaceans and thus obtain paths.

Preferably, the system implementing the method is composed of a kit that is released at sea and comprises the N−1 floating hydrophones distant by a few tens of meters, provided with a GPS location system or a small emitting beacon (for autolocation of the hydrophones). The Nth hydrophone (with the same characteristics) is immersed at a few tens of meters under the others. Thus the drifts of the hydrophones can be calculated by GPS or audible transmitters situated on each hydrophone in order to relocate them precisely every minute according to the position of a reference hydrophone (on the hull of a broken-down boat for example). The hydrophones are connected by cable or new-generation portable telephone to the on-board PC, and the tracking of the whales detected is then possible in real time.

Reference is made to FIG. 13, which shows a flow diagram of a method for using and exploiting the positions (location in terms of x,y,z) obtained (at 19) of the whales by virtue of the tracking method, for behavioural study thereof.

From the TDOAs and the signal of each hydrophone, it is possible to proceed with the labelling 23 of the signal and to determine its energy and the interclick interval (ICI). In addition, the location at 19 makes it possible to determine the path and consequently other parameters such as the change in distance of the whale, the angle of its head and the speed of the whale with respect to the hydrophone i. These data combined at 24 with those coming from the labelling can therefore be integrated, annotated, structured by means of XML-type files, and finally stored automatically in a database.

Finally, they can be analysed at 25, as required, in order better to understand the behaviour of whales in different situations: hunting, ingestion of squids, seeking prey, etc.

Advantages of the Invention

The tracking method according to the invention meets the aims fixed. Thus the invention makes it possible to observe, passively, without any disturbance of the environment or the whales, a group of several whales moving at several hundreds of meters under the surface and in an area of several square kilometers.

By virtue of the steps of preprocessing and filtering the signal from the hydrophones, the invention functions for low signal/noise ratios (SNRs) without complex frequency processing operations but by filtering and analysing a controlled number of TDOAs allowing processing in real time.

The signal referenced by "click" or non-stationary signal throughout the text of this patent application can be replaced by any other quasi-stationary, or even harmonic, signal as long as it is possible to detect therein singular events that are fairly precise in time, these singularities enabling events in the signal to be dated, such as the times of the start of intermittent harmonics ("onset"). Naturally, if the signal is propagating in a medium other than sea water, it will be necessary to replace the hydrophones described in relation to the example of tracking cetaceans in a marine environment, with sensors adapted to the acoustic or electromagnetic signal to be captured.

The method according to the invention can easily be executed in real time using software functioning on a portable PC of the "Windows™"/Matlab™ type provided with a microprocessor of the "Pentium™" type and a random access memory of around 1 Gigabyte.

It is interesting to note that the method according to the invention makes it possible to detect and track X sources with Y sensors while having a number of sensors Y less than that of the X sources. (Thus 4=<Y, and X varies from 1 to a dozen, but Y is not necessarily greater than or equal to X). The invention also enables the labelling of superimposed emissions from several sources and, in the case of cetaceans, analysis of their individual and group behaviour, the characteristics of their transmissions relating to their hunting behaviour for example (interclick interval in particular), and counting thereof while they are submerged for long periods.

The invention also makes it possible to estimate the mean velocity of a signal in any medium (liquid, solid or gaseous, or having several phases), having recourse if necessary to the artificial emission from controlled sources.

Main Applications of the Tracking Method According to the Invention:

The applications of the simultaneous tracking method according to the invention are numerous, in several fields. A few of these will be cited, solely by way of example and without any limitative character.

The properties and advantages of the invention concern, in addition to some military applications, ethologists, who have very few data on these animals, which pass most of their life in very great depths (below −1000 meters).

From an ecological and ethological point of view, the method supplies the positions and paths in real time, and the attribution of the clicks to the sources thereof. Consequently it enables cetaceans to be counted indirectly and the sex and size thereof to be determined. It is possible to deduce migration maps from this and to study the variations in behaviour of cetaceans, and to correlate them in particular with climatic changes.

The method according to the invention defines a complete system for registering several items of information describing the activity of marine mammals in a given maritime zone of several $km^3$ (such as for example in a sanctuary such as "PELAGOS" in the Ligurian Sea, off Toulon and Genoa).

From a military point of view, the invention makes it possible in particular to establish instantaneous or historical maps of density of cetacean populations in order not to interfere with cetaceans during military tests. Likewise, from fishing activities, the use of acoustic repellents being unreliable, the invention makes it possible to know in real time the presence of cetaceans during fishing and to manoeuvre accordingly.

From the civil (ferry) point of view and the merchant navy, the invention makes it possible to detect the presence of cetaceans on commercial maritime routes in order to avoid collisions between cetaceans and boats.

Thus it is possible to better assess the presence of mammals frequenting a zone throughout the year and thus to contribute to the protection thereof, but also better military management of the environment.

By virtue of the invention, it is also possible to monitor a given sensitive area, such as aquaculture areas, ports, etc., and to detect intrusion therein by cetaceans, by detecting their clicks and comparing the detected signal with an alert threshold. It suffices to install in the area four or five fixed hydrophones connected to the coast by cable or wireless communication means, and to supply with a signal coming from the hydrophones a server able to execute the tracking method according to the invention and to calculate alert thresholds. The tracking system is therefore associated with alert means suitable for emitting an alert signal when clicks corresponding to the presence of one or more cetaceans are detected on the signal coming from the hydrophones placed in the said area.

The invention claimed is:

1. A method for the passive tracking of a plurality of objects emitting respective signals in the form of a series of predetermined sounds, comprising the following steps:

during successive processing time windows, acquiring raw analogue signals from a plurality of sensors, wherein at least some of the raw analogue signals correspond to the signals emitted by the plurality of objects;

converting the raw analogue signals into digital data by sampling at a certain sampling frequency;

filtering the digital data to eliminate spurious noise;

eliminating echoes in the filtered signal by performing the following steps:

determining an envelope of the filtered digital data;

integrating the envelope on time windows; and comparing a result of the integrated envelope with a predetermined threshold, wherein if the result is below the predetermined threshold, a signal corresponding to the result is one of the predetermined sounds and is stored in a memory and, if the result is above the said predetermined threshold, a signal corresponding to the result is an echo and is eliminated;

obtaining, for each pair of sensors and each processing window, potential values (TDOA) of differences in arrival time of the stored signals to reach two distinct sensors;

for each pair of sensors, verifying the coherence of the TDOAs, and selecting a number (nbTDOA) of filtered TDOAs coherent with each other; and from the filtered and coherent TDOAs, determining the successive instantaneous positions of the sources of the predetermined sounds by non-linear regression and deducing the path of the plural objects in their environment in real time.

2. A tracking method according to claim 1, wherein said filtering step comprises applying the Teager-Kaiser operator to the digital data corresponding to the raw signal, to obtain a signal composed of peaks having an amplified amplitude, and a Gaussian additive noise.

3. A tracking method according to claim 2, wherein the sampling frequency of the signals acquired is greater than an inverse of a duration of a predetermined sound, and further including a decimation step that is carried out before the filtering step by replacing N consecutive analogue samples with their mean, so as to obtain a frequency signal N times lower, and a noise with a variance reduced N times but with higher signal amplitudes compared with the noise.

4. A tracking method according to claim 2, wherein the filtering step comprises applying, to the digital values issuing from the filtering step by the Teager-Kaiser operator, a Mallat algorithm with a universal threshold, which includes keeping the N highest peaks due to potential predetermined sounds from a source, and determining, from a position of these peaks, the potential TDOAs corresponding to the predetermined sounds from the source.

5. A tracking method according to claim 4 wherein a number N of TDOAs to be kept in the TDOA determination step is greater than or equal to 5 and less than or equal to 35.

6. A tracking method according to claim 1, wherein the filtering step comprises an adaptive stochastic filtering.

7. A tracking method according to claim 1 wherein, in order to determine that the TDOAs are coherent with each other, selecting among the TDOAs that potentially correspond to predetermined sounds from the source, those that satisfy the transition principle of the TDOAs and satisfy the system of equations:

$$TDOA_u(i,j)+TDOA_v(j,k)=TDOA_w(i,k)\pm er;$$

$$TDOA_u(i,j)+TDOA_x(j,h)=TDOA_y(i,h)\pm er;$$

$$TDOA_w(i,k)+TDOA_z(k,h)=TDOA_y(i,h)\pm er;$$

$$TDOA_v(j,k)+TDOA_z(k,h)=TDOA_x(j,h)\pm er;$$

where er is equal to three times an uncertainty caused by decimation of the raw signal, and $TDOA_x(i,j)$ designates an $x^{th}$ potential TDOA between the sensors i and j.

8. A tracking method according to claim 1 further comprising eliminating the TDOAs satisfying the following equations:

$$TDOA_x(i,j)-TDOA_1(i,j)=k*E(i)\pm0.002, k\in\{1,2\}, x\in\{2\ldots nbTDOA\}$$

$$TDOA_x(i,j)-TDOA_1(i,j)=-k*E(j)\pm0.002, k\in\{1,2\}, x\in\{2\ldots nbTDOA\}$$

where $TDOA_x(i,j)$ designates the $x^{th}$ potential TDOA between the sensors i and j, E(i) designates a difference in time between a predetermined sound and its echo on sensor i, K is an integer equal to 1 or 2, i,j are integers less than or equal to the number of sensors, x is an integer between 2 and the number nbTDOA.

9. A tracking method according to claim 1 wherein, in order to determine, from the coherent TDOAs, the instantaneous position Xs(t) of an object emitting a predetermined sound, a non-linear regression is performed according to the Gauss-Newton algorithm using three independent TDOAs of each quadruplet of sensors to minimize the LMS (Least Mean Square) error in the system of the following three equations:

$$Q(X_s,X_i)-Q(X_s,X_1)=TDOA_u(i,j)*c,$$

$$Q(X_s,X_i)-Q(X_s,X_k)=TDOA_v(i,k)*c,$$

$$Q(X_s,X_i)-Q(X_s,X_h)=TDOA_y(i,h)*c,$$

where $Q(X_s,X_a)$ is the Euclidian distance between the source $$X_s = \begin{bmatrix} x \\ y \\ y \end{bmatrix}_s$$

and the sensor of coordinates $X_a$, and c represents the velocity of a sound wave.

10. A tracking method according to claim 9, wherein the path of the object is determined from the successive instantaneous positions Xs(t).

11. A passive tracking method according to claim 1, wherein the object is at least one source of an acoustic or electromagnetic signal having singularities enabling events in the signal to be dated, and propagating in any medium, and the sensors are adapted to the acoustic or electromagnetic signal.

12. A tracking method according to claim 1, wherein the plurality of sensors includes hydrophones, the at least one object is a cetacean in a marine environment, and the predetermined sounds are clicks.

13. A system for the passive tracking of a plurality of objects, comprising:

a. an array of at least four sensors disposed in a detection zone, each sensor being connected to an acquisition card for digitizing signals detected by the sensors; and b. a computer connected to the acquisition cards and hosting detection application software implementing the following operations:

filtering the digital data to eliminate spurious noise;

eliminating echoes in the filtered signal by performing the following steps:

determining an envelope of the filtered digital data;

integrating the envelope on time windows; and comparing a result of the integrated envelope with a predetermined threshold, wherein if the result is below the predetermined threshold, a signal corresponding to the result is one of a plurality of predetermined sounds and is stored in a memory and, if the result is above the said predetermined threshold, a signal corresponding to the result is an echo and is eliminated;

obtaining, for each pair of sensors and each processing window, potential values (TDOA) of differences in arrival time of the stored signals to reach two distinct sensors;

for each pair of sensors, verifying the coherence of the TDOAs, and selecting a number (nbTDOA) of filtered TDOAs coherent with each other;

from the filtered and coherent TDOAs, determining the successive instantaneous positions of the sources of the predetermined sounds by non-linear regression and deducing the path of an object in its environment in real time.

14. A passive tracking method comprising the steps of equipping an area to be monitored with a tracking system according to claim 13, and an alert notifier that emits an alert signal when predetermined sounds corresponding to the presence of one or more objects are detected on the signal coming from the sensors placed in the monitored area.

15. A tracking system according to claim 13, wherein the at least four sensors include hydrophones, the plurality of objects include cetaceans in a marine environment, and the predetermined sound is a click.

* * * * *